(12) United States Patent
Ozawa et al.

(10) Patent No.: US 9,025,348 B2
(45) Date of Patent: May 5, 2015

(54) DRIVE CIRCUIT

(75) Inventors: Keiichiro Ozawa, Niiza (JP); Akio Iwabuchi, Niiza (JP); Yasushi Tasaka, Niiza (JP); Ryuichi Furukoshi, Asaka (JP)

(73) Assignee: Sanken Electric Co., Ltd., Niiza-shi (JP)

( * ) Notice: Subject to any disclaimer, the term of this patent is extended or adjusted under 35 U.S.C. 154(b) by 209 days.

(21) Appl. No.: 13/608,359

(22) Filed: Sep. 10, 2012

(65) Prior Publication Data

US 2013/0070487 A1 Mar. 21, 2013

(30) Foreign Application Priority Data

Sep. 16, 2011 (JP) ................................. 2011-203414
Jul. 30, 2012 (JP) ................................. 2012-167941

(51) Int. Cl.
 *H02M 3/335* (2006.01)
 *H02M 1/36* (2007.01)
 *H02M 1/00* (2006.01)

(52) U.S. Cl.
 CPC ............ *H02M 1/36* (2013.01); *H02M 3/33523* (2013.01); *H02M 2001/0006* (2013.01)

(58) Field of Classification Search
 USPC ......... 323/271, 272, 282, 283, 284, 285, 289; 363/21.12, 21.13, 21.07, 21.1, 21.11, 363/21.17, 21.16, 21.01, 21.02; 327/108, 327/109, 110, 111
 See application file for complete search history.

(56) References Cited

U.S. PATENT DOCUMENTS

| 5,285,369 | A | 2/1994 | Balakrishnan |
| 6,580,258 | B2 * | 6/2003 | Wilcox et al. ................. 323/282 |
| 2005/0077884 | A1 * | 4/2005 | Krug et al. .................... 323/282 |
| 2011/0133661 | A1 * | 6/2011 | Ren et al. ................... 315/209 R |
| 2012/0007572 | A1 * | 1/2012 | Oddoart ........................ 323/282 |

FOREIGN PATENT DOCUMENTS

| DE | 100 40 453 A1 | 3/2002 |
| JP | 4-105552 | 4/1992 |

OTHER PUBLICATIONS

Office Action issued on Jun. 4, 2014 in the corresponding Chinese Patent Application No. 201210337982.4.

* cited by examiner

*Primary Examiner* — Gary L Laxton
*Assistant Examiner* — Trinh Dang
(74) *Attorney, Agent, or Firm* — Oblon, McClelland, Maier & Neustadt, L.L.P.

(57) ABSTRACT

A drive circuit drives a normally-on high-side switch Q1 and a normally-off low-side switch Q2 that form a series circuit connected in parallel with a DC power source. The drive circuit includes a controller 10 that outputs a control signal to turn on/off the high- and low-side switches, a rectifier D2 having a first end connected to a connection point of the high- and low-side switches, a capacitor C2 that is connected to a second end of the rectifier and a first end of the DC power source and serves as a power source for the controller, and a driver (A1, AND1, Q3, Q4) that turns on/off the high- and low-side switches according to the control signal from the controller and a voltage from the capacitor.

9 Claims, 21 Drawing Sheets

DRIVE CIRCUIT

BACKGROUND OF THE INVENTION

1. Field of the Invention

The present invention relates to a drive circuit for driving a switching element in, for example, a switching power source apparatus.

2. Description of Related Art

An example of a switching power source apparatus is described in Japanese Unexamined Patent Application Publication No. H04-105552 (Patent Document 1). This apparatus connects a primary winding of a transformer and a switching element, which is a MOSFET, in series to both ends of a DC power source. The apparatus turns on/off the switching element to generate an AC voltage on a secondary winding of the transformer. The AC voltage on the secondary winding is rectified and smoothed with a first rectifying-smoothing circuit into a DC output voltage, which is supplied to a load.

The DC output voltage is fed back through, for example, a photocoupler to a controller on the primary side of the transformer. Based on the fed-back voltage, the controller controls the switching frequency of the switching element in such a way as to bring the DC output voltage to a target value.

The transformer is provided with an auxiliary winding to generate an AC voltage, which is rectified and smoothed with a second rectifying-smoothing circuit into a DC voltage and is supplied as a control power source to the controller that is a part of the drive circuit. The controller is driven by the control power source and outputs a pulse signal according to which the drive circuit turns on/off the switching element.

SUMMARY OF THE INVENTION

According to the related art, the transformer must have the auxiliary winding, to increase the cost of the drive circuit.

The present invention provides a drive circuit that is low-cost and is capable of securing a power source for a controller without arranging an auxiliary winding for a transformer.

According to an aspect of the present invention, the drive circuit drives a normally-on high-side switch and a normally-off low-side switch being connected in a series manner and connected in parallel with a DC power source. The drive circuit includes a controller that outputs a control signal to turn on/off the high-side and low-side switches, a rectifier having a first end connected to a connection point of the high-side and low-side switches, a capacitor that is connected to a second end of the rectifier and a first end of the DC power source and serves as a power source for the controller, and a driver that turns on/off the high-side and low-side switches according to the control signal from the controller and a voltage from the capacitor.

DESCRIPTION OF PREFERRED EMBODIMENTS

Switching power source apparatuses having drive circuits according to embodiments of the present invention will be explained in detail with reference to the drawings.

Embodiment 1

Figure 1:
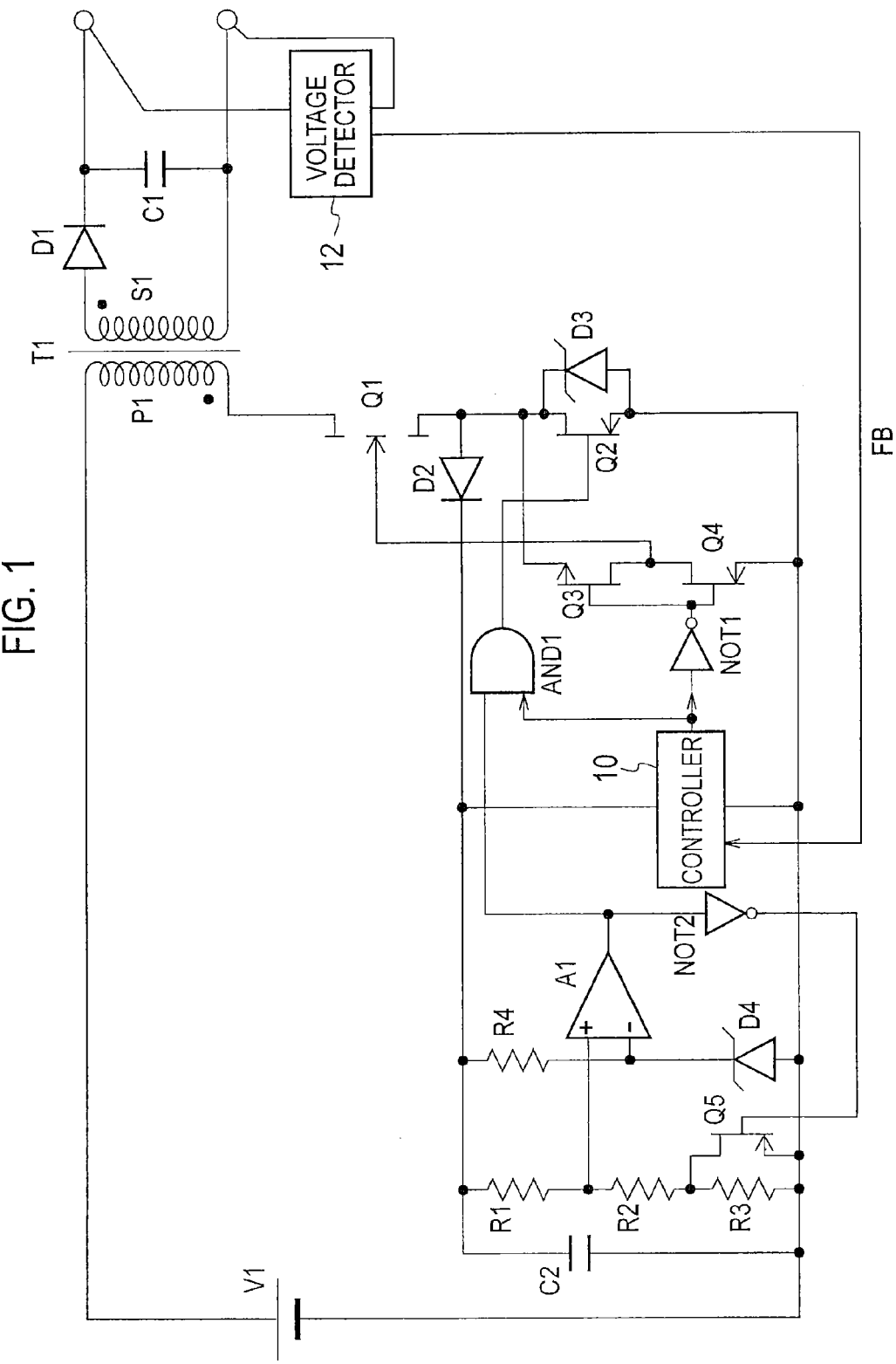
FIG. 1 is a circuit diagram illustrating a switching power source apparatus having a drive circuit according to Embodiment 1 of the present invention.

FIG. 1 is a circuit diagram illustrating a switching power source apparatus having a drive circuit according to Embodiment 1 of the present invention. In FIG. 1, both ends of a DC power source V1 are connected to a series circuit including a primary winding P1 of a transformer T1, a switching element Q1, and a switching element Q2. The switching element Q1 is a normally-on switch and is made of, for example, GaN. The switching element Q2 is a normally-off MOSFET.

The switching elements Q1 and Q2 are alternately or simultaneously turned on/off by a controller 10. The transformer T1 has a secondary winding S1 whose first end is connected to an anode of a diode D1. A cathode of the diode D1 is connected to a first end of a capacitor C1. A second end of the capacitor C1 is connected to a second end of the secondary winding S1. The diode D1 and capacitor C1 form a rectifying-smoothing circuit that rectifies and smoothes an AC voltage generated by the secondary winding S1 into a DC output voltage to be supplied to a load (not illustrated).

A voltage detector 12 detects a voltage across the capacitor C1, i.e., the DC output voltage and outputs the detected voltage as a feedback signal FB to the controller 10. According to the feedback signal FB, the controller 10 controls ON/OFF duty ratios of the switching elements Q1 and Q2, thereby controlling the DC output voltage to a predetermined value.

Between a drain and a source of the switching element Q2, a zener diode D3 is connected. A connection point of the switching elements Q1 and Q2 is connected to an anode of a diode D2. A cathode of the diode D2 is connected to a power source terminal of the controller 10, a first end of a capacitor C2, a first end of a resistor R1, and a first end of a resistor R4.

Both ends of the capacitor C2 are connected to a series circuit including resistors R1, R2, and R3 and are also connected to a series circuit including the resistor R4 and a zener diode D4. A connection point of the resistors R1 and R2 is connected to a non-inverting input terminal (+) of a comparator A1. A connection point of the resistor R4 and zener diode D4 is connected to an inverting input terminal (−) of the comparator A1.

The comparator A1 is a hysteresis comparator having an upper threshold Hth and a lower threshold Lth. If a voltage VC2 of the capacitor C2 increases to the upper threshold Hth or over, the comparator A1 outputs a high-level signal, and if the voltage VC2 decreases to the lower threshold Lth or below, the comparator A1 outputs a low-level signal.

The hysteresis comparator is realized with the resistors R1 to R3, a NOT gate NOT2, a transistor Q5, and the zener diode D4. A resistance ratio of R1:R2 is, for example, 1:1 and R3 is 0.1×R2.

An output terminal of the comparator A1 is connected to a first input terminal of an AND gate AND1 and an input terminal of the NOT gate NOT2. A connection point of the resistors R2 and R3 is connected to a drain of the transistor Q5 that is an n-type MOSFET. A gate of the transistor Q5 is connected to an output terminal of the NOT gate NOT2. A source of the transistor Q5 is connected to a second end of the capacitor C2, a first end of the resistor R3, an anode of the zener diode D4, a ground terminal of the controller 10, and a source of a transistor Q4 that is an n-type MOSFET.

An output terminal of the controller 10 is connected to a second input terminal of the AND gate AND1 and an input terminal of a NOT gate NOT1. An output terminal of the NOT gate NOT1 is connected to a gate of a transistor Q3 that is a p-type MOSFET and a gate of the transistor Q4. Drains of the transistors Q3 and Q4 are connected to a gate of the switching element Q1. A source of the transistor Q3 is connected to a source of the switching element Q1 and a drain of the switching element Q2. An output terminal of the AND gate AND1 is connected to a gate of the switching element Q2.

Figure 2:
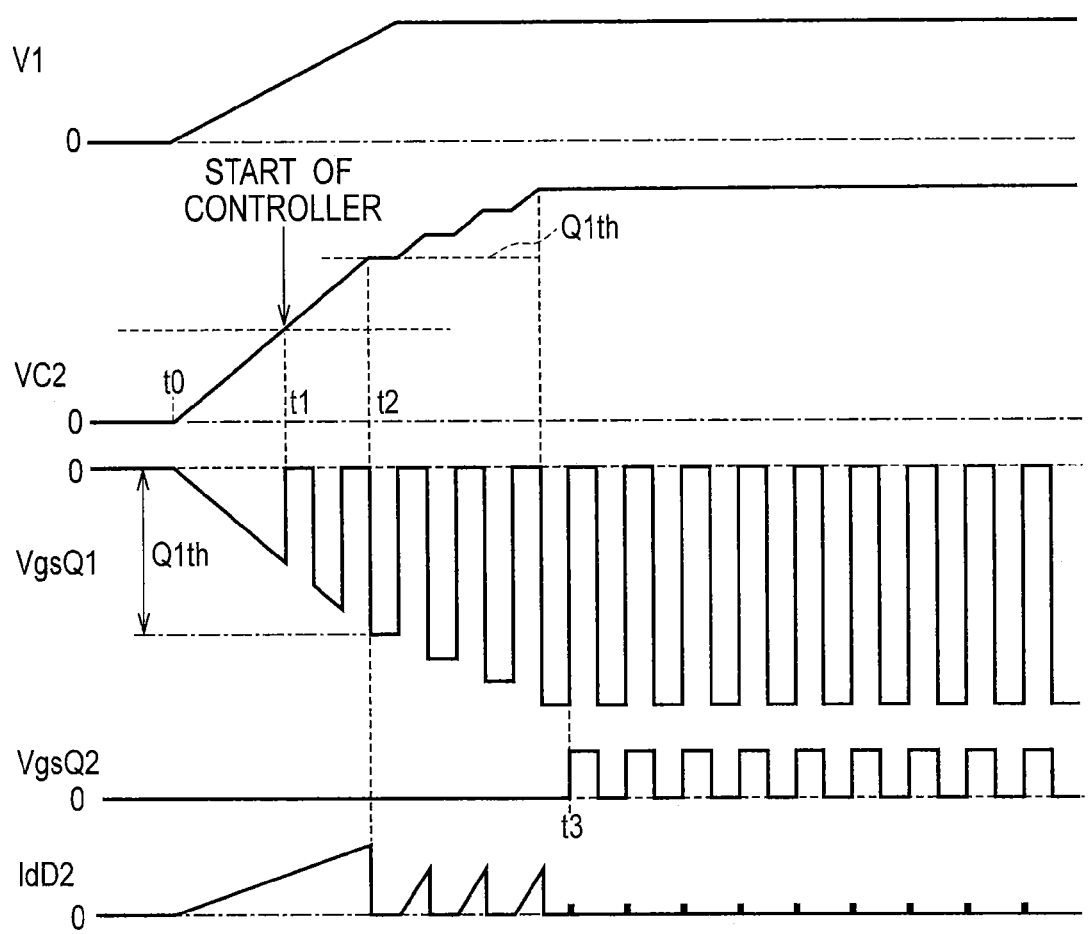
FIG. 2 is a timing chart illustrating a startup operation of the apparatus of FIG. 1.

Operation of the drive circuit according to Embodiment 1 will be explained. First, a startup operation thereof will be explained with reference to FIG. 2. In FIG. 2, V1 is a voltage of the DC power source V1, VC2 is a voltage across the capacitor C2, VgsQ1 is a gate-source voltage of the switching element Q1, VgsQ2 is a gate-source voltage of the switching element Q2, and IdD2 is a current passing through the diode D2.

At time t0, the switching element Q1 turns on to clockwise pass a current through a path extending along a positive electrode of V1, P1, Q1, D2, C2, and a negative electrode of V1, thereby charging the capacitor C2. The voltage VC2 of the capacitor C2 starts to increase.

At time t1, the voltage VC2 of the capacitor C2 reaches an operation start voltage of the controller 10 and the controller 10, comparator A1, and AND gate AND1 start to operate. At this time, the voltage VC2 is lower than a gate threshold voltage Q1th of the switching element Q1, and therefore, the switching element Q1 is continuously ON.

At time t2, the voltage VC2 of the capacitor C2 reaches the gate threshold voltage Q1th of the switching element Q1. The controller 10 outputs a pulse signal to alternately turn on/off the transistors Q3 and Q4, thereby starting an ON/OFF operation of the switching element Q1. During every ON period of the switching element Q1, the capacitor C2 is charged to continuously increase the voltage VC2 of the capacitor C2.

At this time, the voltage VC2 of the capacitor C2 is not an overvoltage, and therefore, the comparator A1 provides the AND gate AND1 with a low-level signal to keep the switching element Q2 off.

At time t3, the voltage VC2 of the capacitor C2 becomes an overvoltage, and therefore, the comparator A1 provides the AND gate AND1 with a high-level signal. The AND gate AND1 provides an AND logic of the pulse signal of the controller 10 and the high-level signal from the comparator A1. As a result, the switching element Q2 starts an ON/OFF operation in synchronization with the ON/OFF operation of the switching element Q1. This results in limiting the current IdD2 passing through the diode D2 and shifting to a normal operation.

Figure 3:
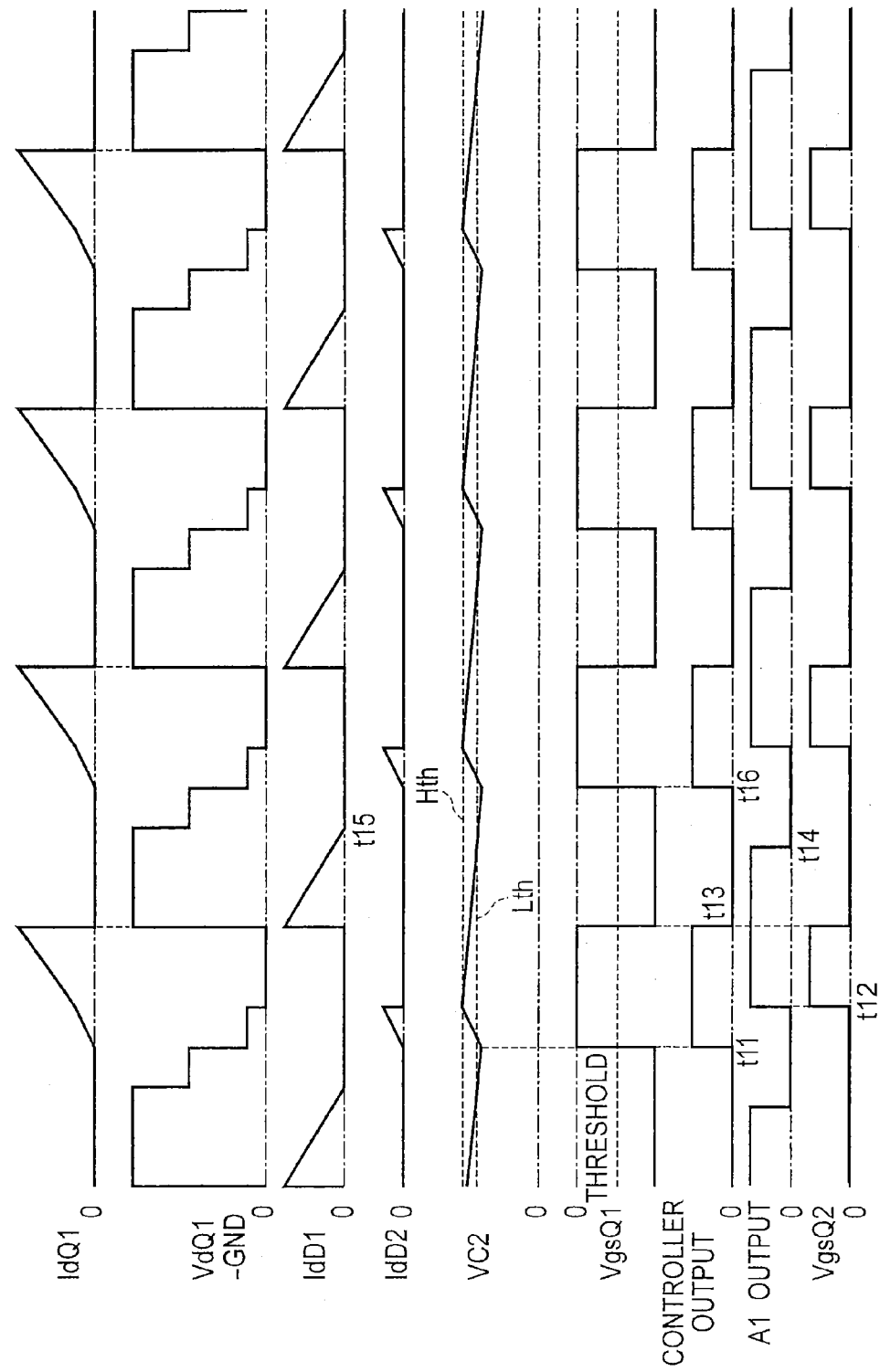
FIG. 3 is a timing chart illustrating a normal operation of the apparatus of FIG. 1.

The normal operation of the switching power source apparatus will be explained with reference to FIG. 3. In FIG. 3, IdQ1 is a drain current of the switching element Q1, VdQ1 is a drain-source voltage of the switching element Q1, IdD1 is a current passing through the diode D1, and A1 is an output from the comparator A1.

At time t11, the controller 10 outputs a high-level signal, and therefore, the NOT gate NOT1 outputs a low-level signal to the gate of the transistor Q3, to turn on the transistor Q3 and switching element Q1. The DC power source V1 provides the current IdQ1 through the primary winding P1 to the switching element Q1 and the current IdD2 to the diode D2 to charge the capacitor C2.

The voltage VC2 of the capacitor C2 is not an overvoltage, and therefore, the comparator A1 provides the AND gate AND1 with a low-level signal, to keep the switching element Q2 off.

At time t12, the voltage VC2 of the capacitor C2 exceeds the upper threshold Hth and the comparator A1 provides the AND gate AND1 with a high-level signal to turn on the switching element Q2. As a result, the current IdD2 of the diode D2 disappears and the voltage VC2 of the capacitor C2 stops increasing.

At time t13, the controller 10 outputs a low-level signal to turn on the transistor Q4 and off the switching element Q1. As a result, the current IdQ1 disappears. The low-level signal of the controller 10 is applied to the AND gate AND1, to turn off the switching element Q2.

At time t14, the voltage VC2 of the capacitor C2 decreases to the lower threshold Lth and the comparator A1 provides the AND gate AND1 with a low-level signal.

In this way, the switching power source apparatus employing the drive circuit according to Embodiment 1 charges the capacitor C2 through the connection point of the normally-on switching element Q1 and normally-off switching element Q2 and the diode D2 and applies the voltage VC2 of the capacitor C2 to the controller 10. Without arranging an auxiliary winding for the transformer T1, Embodiment 1 secures the power source for the controller 10, there by reducing the cost of the switching power source apparatus.

In addition, Embodiment 1 needs no startup circuit for supplying power to the controller 10 at startup of the DC power source V1.

Embodiment 2

Figure 4:
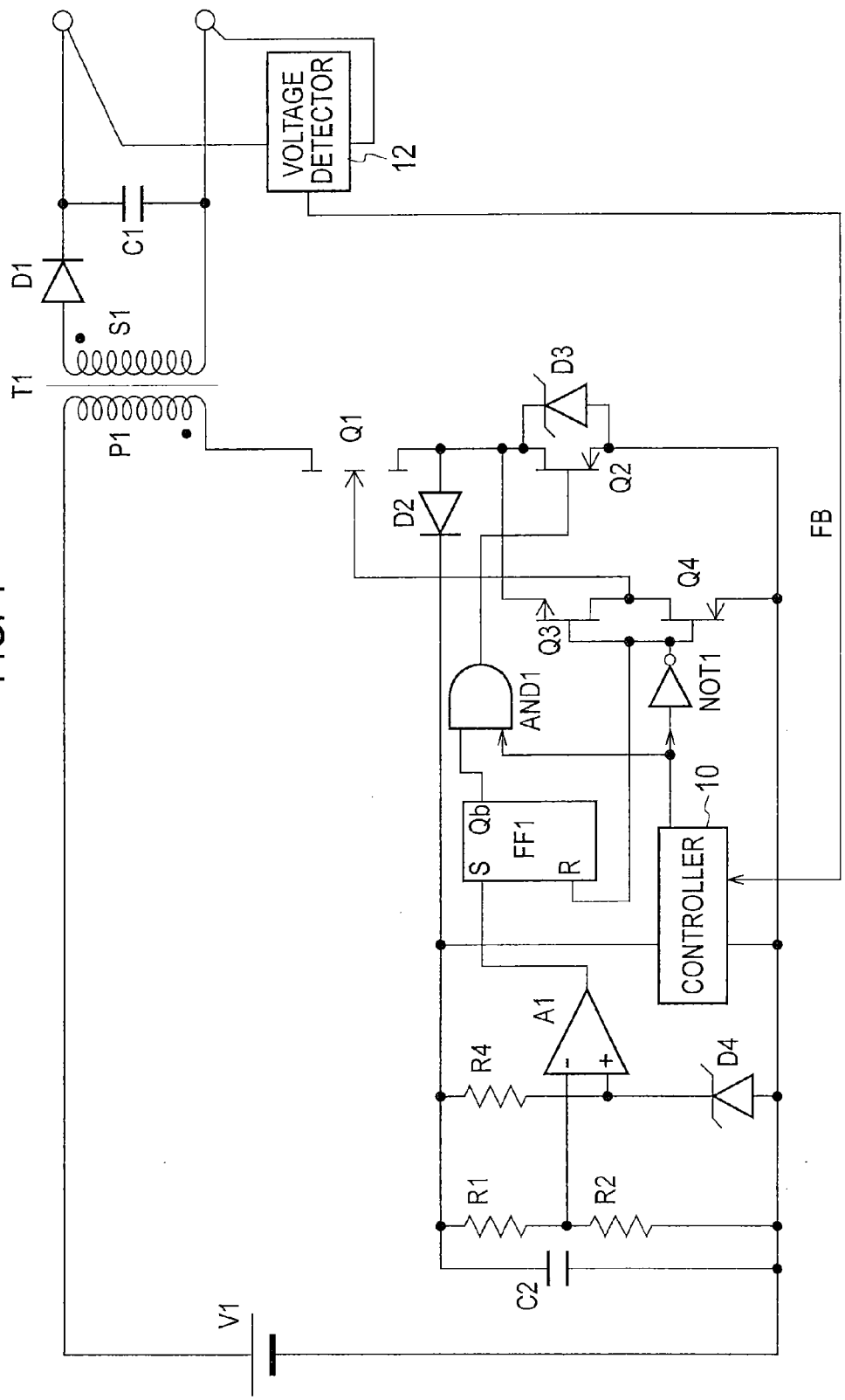
FIG. 4 is a circuit diagram illustrating a switching power source apparatus having a drive circuit according to Embodiment 2 of the present invention.

FIG. 4 is a circuit diagram illustrating a switching power source apparatus having a drive circuit according to Embodiment 2 of the present invention. In FIG. 4, a connection point of resistors R1 and R2 is connected to an inverting input terminal (−) of a comparator A1 and a connection point of a resistor R4 and a zener diode D4 is connected to a non-inverting input terminal (+) of the comparator A1.

An output terminal of the comparator A1 is connected to a set terminal S of a flip-flop FF1. A reset terminal R of the flip-flop FF1 is connected to a gate of a transistor Q3 and a gate of a transistor Q4. An output terminal Qb of the flip-flop FF1 is connected to a first input terminal of an AND gate AND1.

The remaining configuration of Embodiment 2 is the same as Embodiment 1, and therefore, like parts are represented with like reference marks to omit overlapping explanations.

Unlike Embodiment 1 that charges the capacitor C2 (serving as a power source for the controller 10) in every switching operation of the switching element Q1, Embodiment 2 detects when the voltage of a capacitor C2 decreases below a threshold voltage VD4 (breakdown voltage) of the zener diode D4, and only in the next ON period (one pulse) of a switching element Q1, charges the capacitor C2.

With the one-pulse charging, the voltage VC2 of the capacitor C2 increases higher than the threshold voltage VD4 of the zener diode D4. Namely, Embodiment 2 conducts a plurality of switching operations of the switching element Q1 without charging the capacitor C2 unless the voltage VC2 of the capacitor C2 decreases below the threshold voltage VD4 of the zener diode D4.

Figure 6:
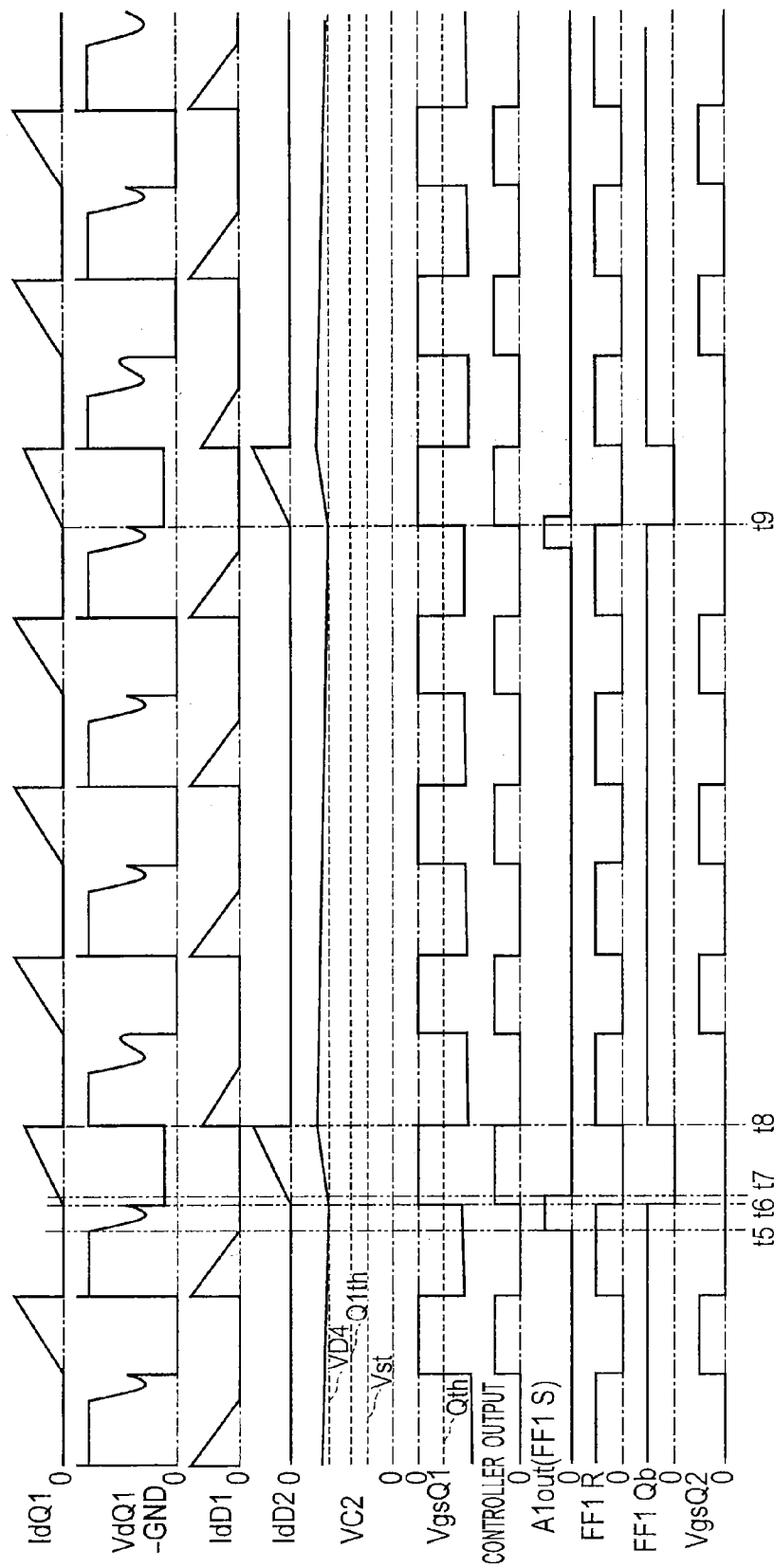
FIG. 6 is a timing chart illustrating a normal operation of the apparatus of FIG. 4.

The number of switching operations of the switching element Q1 carried out without charging the capacitor C2 is determined according to the capacity of the capacitor C2. The larger the capacity of the capacitor C2, the larger the number of switching operations of the switching element Q1 carried out without charging the capacitor C2 increases. In FIG. 6, for the sake of simplicity of explanation, the capacitor C2 is charged whenever the switching element Q1 carries out two switching operations.

Figure 5:
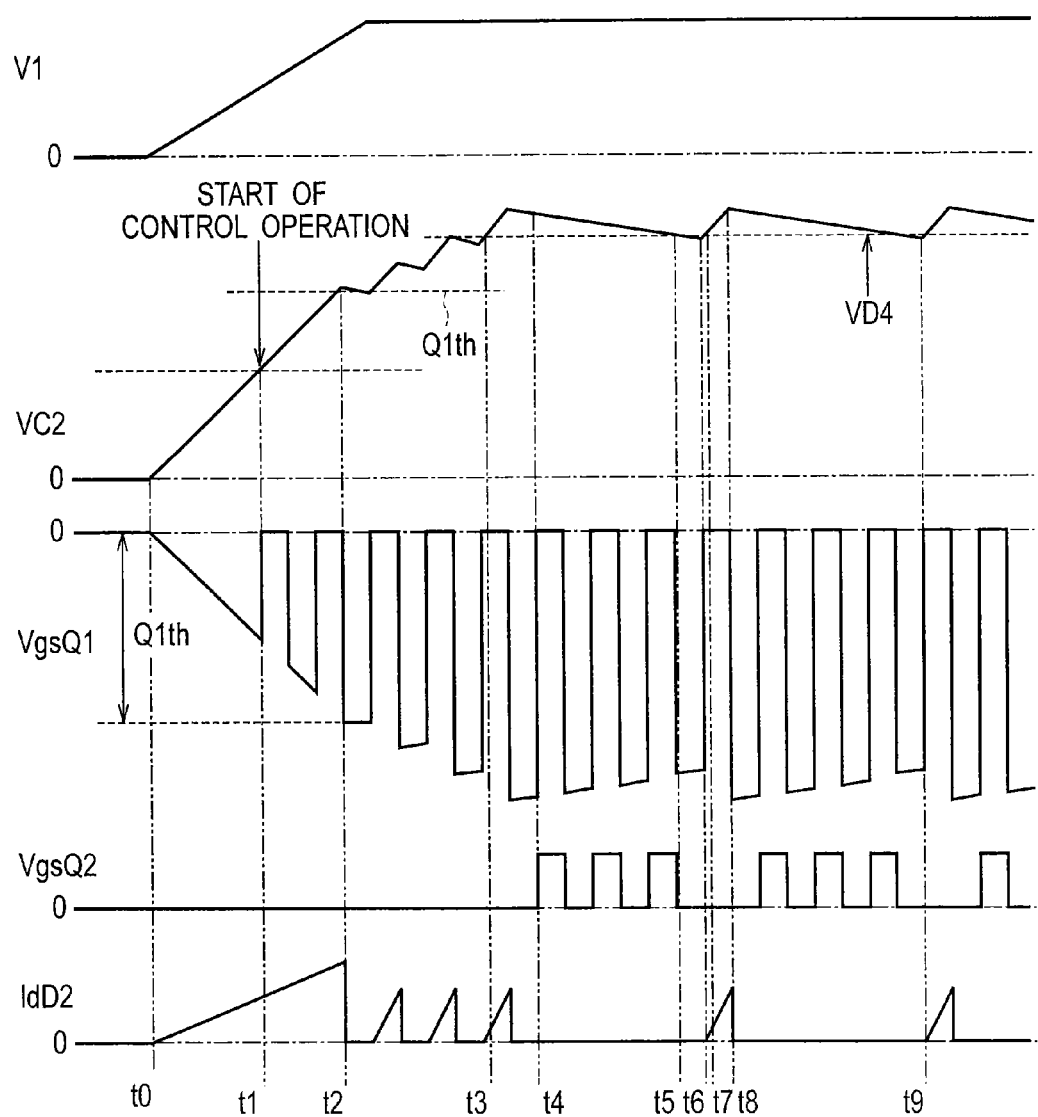
FIG. 5 is a timing chart illustrating a startup operation of the apparatus of FIG. 4.

The threshold voltage VD4 of the zener diode D4 and a threshold voltage Q1th of the switching element Q1 are set to be higher than a minimum operating voltage of a controller 10. A relationship of (operation start voltage of controller 10)<(threshold voltage Q1th of switching element Q1)< (threshold voltage VD4 of zener diode D4) is satisfied as illustrated in FIGS. 5 and 6.

Operation of the drive circuit according to Embodiment 2 will be explained with reference to a startup operation timing chart illustrated in FIG. 5 and a normal operation timing chart illustrated in FIG. 6.

At time t0, the switching element Q1 turns on to cause a current clockwise through a path extending along a positive electrode of V1, P1, Q1, D2, C2, and a negative electrode of V1. This charges the capacitor C2 to increase the voltage VC2 of the capacitor C2.

At time t1, the voltage VC2 of the capacitor C2 reaches the operation start voltage of the controller 10, to start the controller 10, comparator A1, and AND gate AND1. At this time, the voltage VC2 is lower than the gate threshold voltage Q1th of the switching element Q1, and therefore, the switching element Q1 is continuously ON.

At time t2, the voltage VC2 of the capacitor C2 reaches the gate threshold voltage Q1th of the switching element Q1, so that an ON/OFF output signal of the controller 10 starts ON/OFF operation of the switching element Q1.

At this time, the voltage VC2 of the capacitor C2 is lower than the threshold voltage VD4 of the diode D4, and therefore, the comparator A1 outputs a high-level signal to set the flip-flop FF1. The inverting output terminal Qb of the flip-flop FF1 outputs a low-level signal. This low-level signal is supplied through the AND gate AND 1 to a gate of a switching element Q2. Accordingly, the gate signal of the switching element Q2 is low without regard to the ON/OFF output signal of the controller 10. As a result, the switching element Q2 is OFF.

In a period from t2 to t3, the switching element Q2 is OFF, and therefore, the switching element Q1 charges the capacitor C2 through the diode D2 only when the switching element Q1 is ON, thereby continuously increasing the voltage VC2 of the capacitor C2.

At time t3, the voltage VC2 of the capacitor C2 exceeds the threshold voltage VD4 of the diode D4 and the output from the comparator A1 changes from high to low.

After time t4, the set terminal S of the flip-flop FF1 receives the low-level signal and the inverting output terminal Qb of the flip-flop FF1 outputs a high-level signal in synchronization with an ON signal from the controller 10. As a result, the switching element Q2 carries out an ON/OFF operation in synchronization with the ON/OFF operation of the switching element Q1, to stop the charging of the capacitor C2 through the diode D2 during a period from t4 to t6.

At time t5, the voltage VC2 of the capacitor C2 decreases below the threshold voltage VD4 of the diode D4 and the output of the comparator A1 changes from low to high. At time t6, the inverting output terminal Qb of the flip-flop FT becomes low. This turns off the switching element Q2 and restarts the charging of the capacitor C2 through the diode D2.

At time t7, the voltage VC2 of the capacitor C2 exceeds the threshold voltage VD4 of the diode D4 and the comparator A1 again outputs a low-level signal. Accordingly, the charging of the capacitor C2 terminates in a single pulse period from t6 to t8.

In this way, the switching power source apparatus having the drive circuit according to Embodiment 2 sets the flip-flop FF1 through the comparator A1 when the voltage VC2 of the capacitor C2 decreases, to keep the switching element Q2 off in the next ON period of the switching element Q1. Namely, the switching element Q1 turns on and the switching element Q2 turns off at this time, so that a current passes through the diode D2 to the capacitor C2, to increase the voltage VC2 of the capacitor C2. This operation is intermittently carried out to maintain the capacitor C2 at a predetermined voltage or over.

The switching power source apparatus having the drive circuit according to Embodiment 2 provides effects similar to those provided by the switching power source apparatus having the drive circuit according to Embodiment 1.

Embodiment 3

Unlike Embodiment 2 that charges the capacitor C2 in a single switching operation (one pulse) among a plurality of switching operations of the switching element Q1, Embodiment 3 charges the capacitor C2 in a first half of one pulse in which the current IdD2 of the diode D2 is small.

Figure 7:
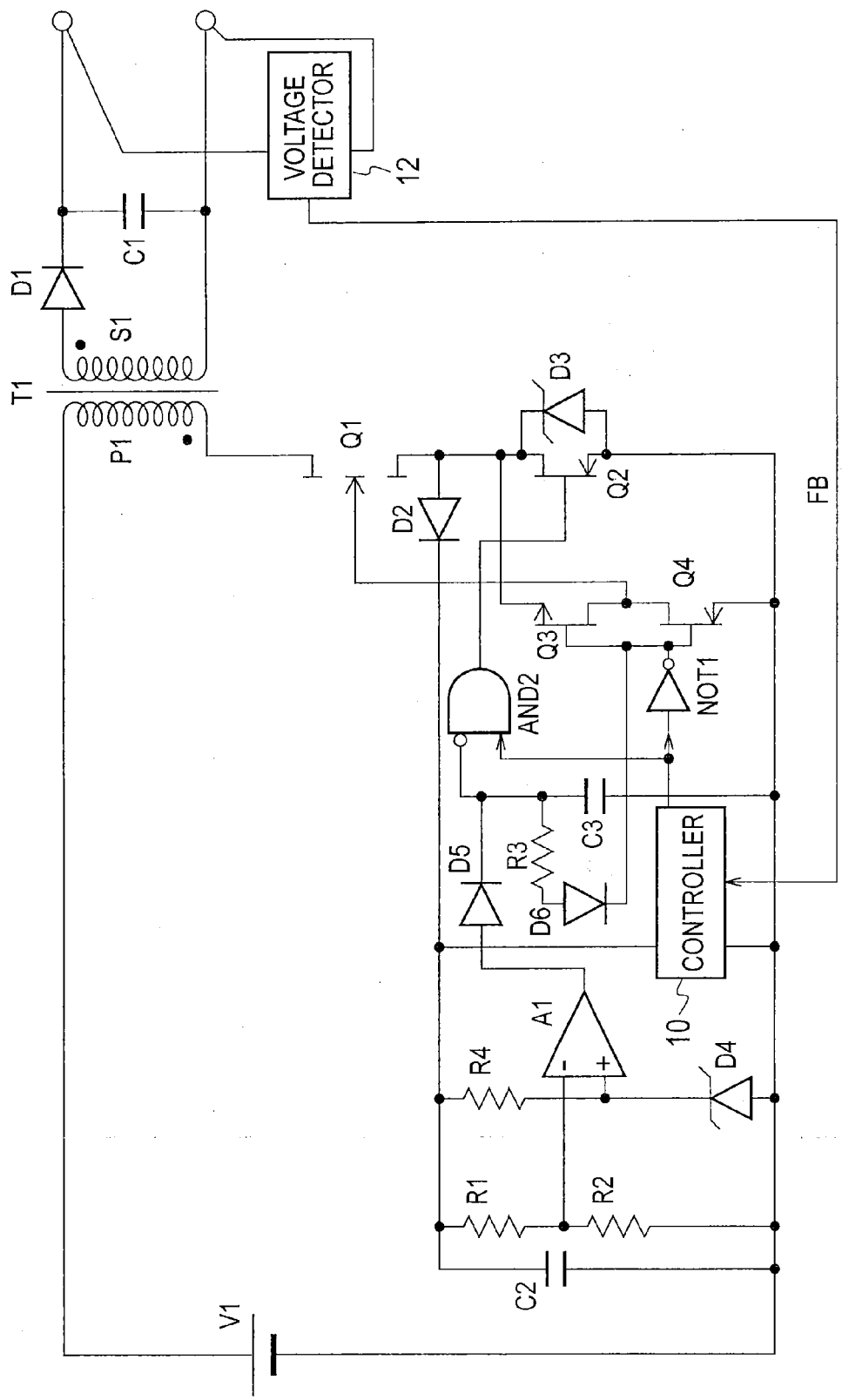
FIG. 7 is a circuit diagram illustrating a switching power source apparatus having a drive circuit according to Embodiment 3 of the present invention.

FIG. 7 is a circuit diagram illustrating a switching power source apparatus having a drive circuit according to Embodiment 3 of the present invention. Differences of the apparatus of Embodiment 3 illustrated in FIG. 7 from the apparatus of Embodiment 2 illustrated in FIG. 3 will be explained.

An output terminal of a comparator A1 is connected to an anode of a diode D5. A cathode of the diode D5 is connected to a first end of a resistor R3, a first end of a capacitor C3, and an inverting input terminal of an AND gate AND2. A second end of the resistor R3 is connected to an anode of a diode D6. A cathode of the diode D6 is connected to gates of transistors Q3 and Q4 and an output terminal of a NOT gate NOT1.

A second end of the capacitor C3 is connected to a ground terminal of a controller 10, an anode of a diode D4, a second end of the capacitor C2, a second end of a resistor R2, and a source of the transistor Q4. The AND gate AND2 performs an AND logic of an inverted signal of a signal from the diode D5 and an output of the controller 10 to a gate of a transistor Q2.

Instead of the flip-flop FF1 of Embodiment 2, Embodiment 3 employs a time constant circuit including D5, D6, R3, and C3. Instead of the AND gate AND1 of Embodiment 2, the present embodiment arranges the AND gate AND2. One of the input terminals of the AND gate AND2 is a NOT input terminal.

The remaining configuration of Embodiment 3 is the same as Embodiment 2, and therefore, like parts are represented with like reference marks to omit overlapping explanations.

Operation of the drive circuit according to the present embodiment will be explained with reference to a startup operation timing chart of FIG. 8 and a normal operation timing chart of FIG. 9.

Figure 8:
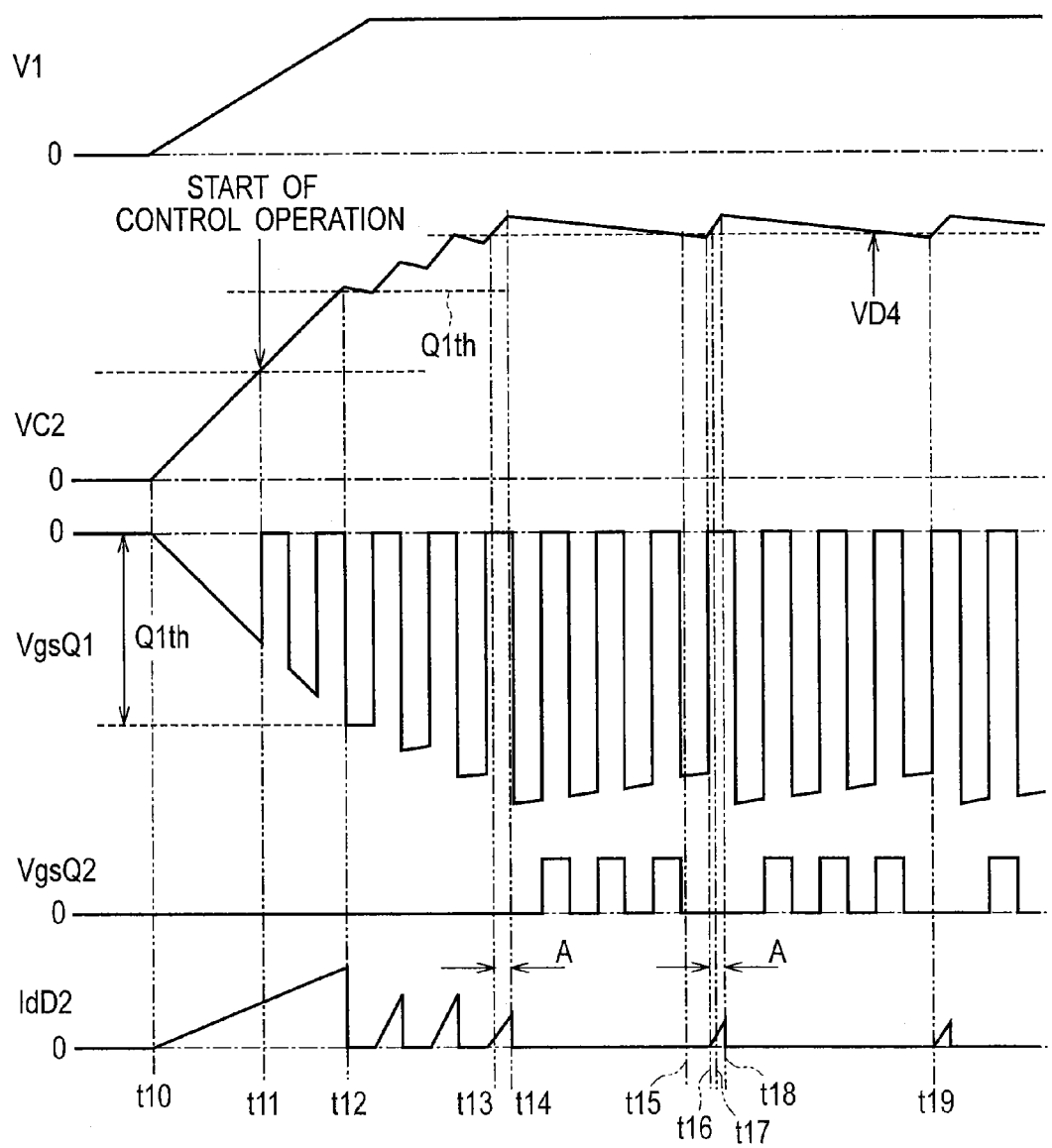
FIG. 8 is a timing chart illustrating a startup operation of the apparatus of FIG. 7.
Figure 9:
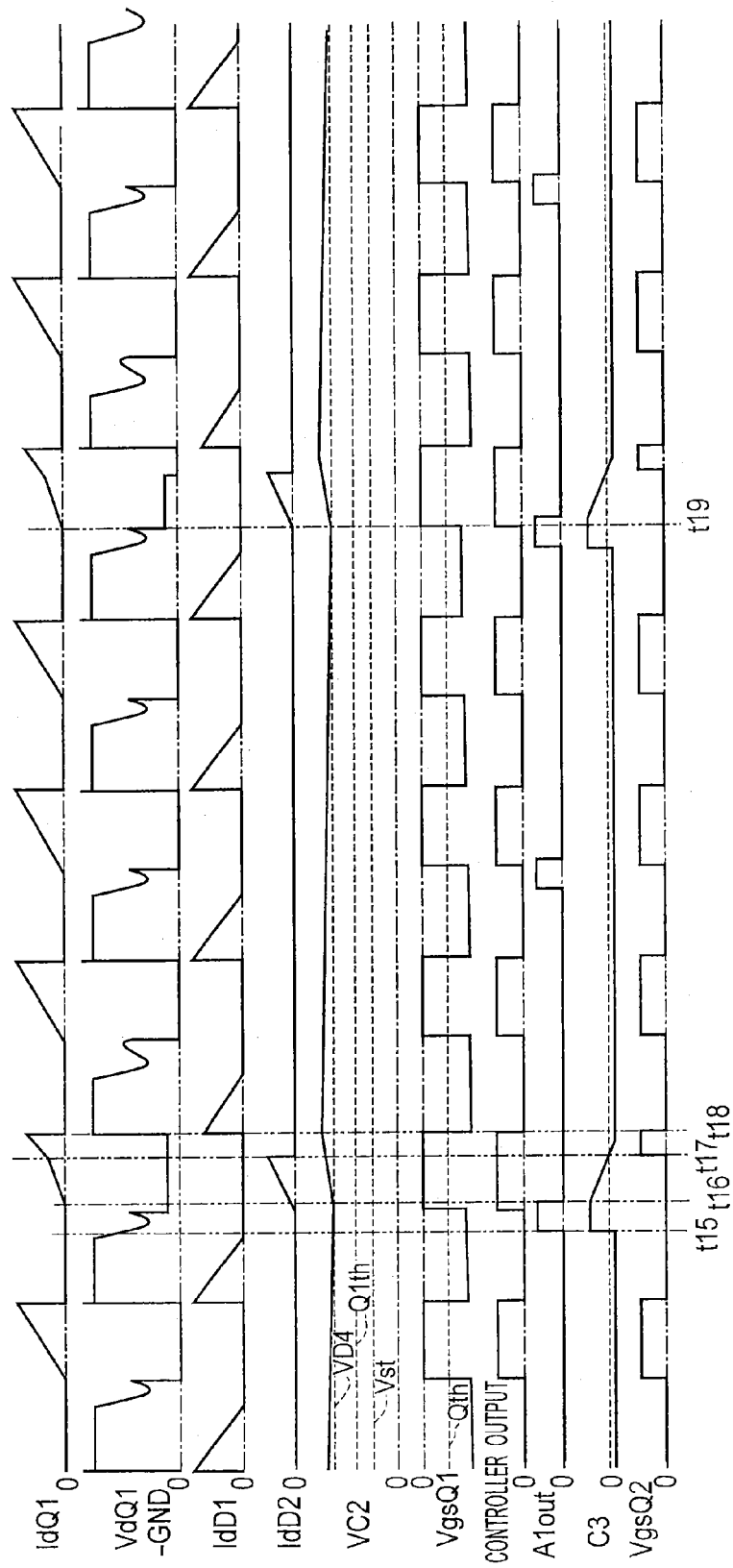
FIG. 9 is a timing chart illustrating a normal operation of the apparatus of FIG. 7.

Operation from time t10 to t13 of FIG. 8 is the same as the operation from time t0 to t3 of Embodiment 2, and therefore, will not be explained.

At time t13, the voltage VC2 of the capacitor C2 exceeds the threshold voltage VD4 of the diode D4 and an output from the comparator A1 changes from high to low. As a result, the capacitor C3 discharges through the resistor R3 and diode D6 to the NOT gate NOT1.

When a time constant time A elapses after time t13, an output from the AND gate AND2 changes from low to high. Here, the time constant time A is determined by a time constant of the resistor R3 and capacitor C3 and a NOT input threshold voltage of the AND gate AND2.

At time t14, the switching element Q2 changes from OFF to ON. When the switching element Q2 turns on, a drain current of the switching element Q1, which has charged the capacitor C2 through the diode D2, passes through the switching element Q2 to the ground.

After time t14, the controller 10 stops the ON signal. Even with the next ON signal, the voltage VC2 of the capacitor C2 is above the threshold voltage VD4 of the diode D4, and therefore, the output from the comparator A1 is low. As a result, the capacitor C3 is not charged and the AND gate AND2 outputs a signal, which is synchronous to the ON/OFF signal of the controller 10, to the gate of the switching element Q2. Accordingly, the switching element Q2 carries out an ON/OFF operation in synchronization with the ON/OFF operation of the switching element Q1. In a period from t14 to t15, the charging of the capacitor C2 through the diode D2 stops.

At time t15, the voltage VC2 of the capacitor C2 decreases below the threshold voltage VD4 of the diode D4 and the output from the comparator A1 becomes high to charge the capacitor C3. In synchronization with the next ON signal of the controller 10, the capacitor C2 is charged.

The capacitor C2 is charged at once, and at time t16, the voltage VC2 of the capacitor C2 again exceeds the threshold voltage VD4 of the diode D4. At time t18 after the time constant time A elapses from time t16, the charging of the capacitor C2 stops. Since the capacitor C2 starts to be charged in synchronization with the ON signal from the controller 10, the charging of the capacitor C2 starts from a drain current IdQ1 of the switching element Q1 being 0 A.

According to the present embodiment, the voltage VC2 of the capacitor C2 is suppressed by properly setting the time constant time A. Namely, the charge voltage of the capacitor C2 is adjustable not to become an overvoltage.

The switching power source apparatus having the drive circuit according to the present embodiment outputs a high-level signal from the comparator A1 to charge the capacitor C3 if the voltage VC2 of the capacitor C2 decreases. In the next ON period of the switching element Q1, the comparator A1 outputs a low-level signal, to discharge the capacitor C3 through the resistor R3.

Until the voltage VC3 of the capacitor C3 decreases to a predetermined value or below, the switching element Q1 is ON and the switching element Q2 OFF, to pass a current through the diode D2 to the capacitor C2, thereby increasing the voltage VC2 of the capacitor C2. This operation is carried out every cycle or intermittently, to maintain the voltage VC2 of the capacitor C2 at a predetermined value or over.

The switching power source apparatus according to Embodiment 3 provides effects similar to those provided by the switching power source apparatus according to Embodiment 1.

Embodiment 4

Figure 10:
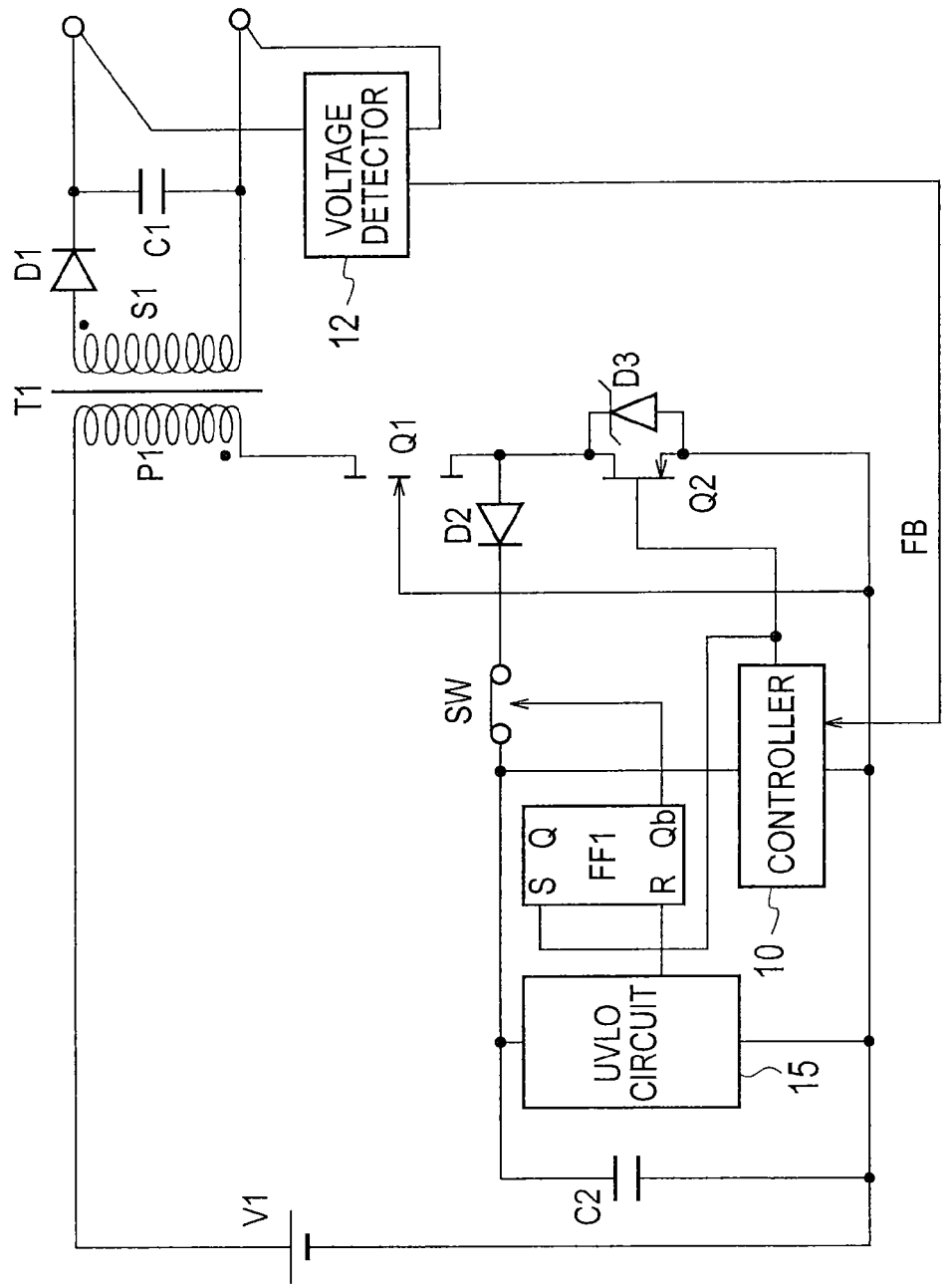
FIG. 10 is a circuit diagram illustrating a switching power source apparatus having a drive circuit according to Embodiment 4 of the present invention.

FIG. 10 is a circuit diagram illustrating a switching power source apparatus having a drive circuit according to Embodiment 4 of the present invention. In FIG. 10, a cathode of a diode D2 is connected to a first end of a switch SW. A second end of the switch SW is connected to a first end of a capacitor C2, a first end of a UVLO (undervoltage lockout) circuit 15, and a first end of a controller 10. A gate of a switching element Q1 is connected to a negative electrode of a DC power source V1, i.e., the ground. The gate of the switching element Q1 may be connected to a predetermined potential.

The controller 10 outputs a pulse signal to turn on/off a low-side switching element Q2. According to the pulse signal of the controller 10 and a voltage of the capacitor C2, the switch SW turns on/off.

Figure 11:
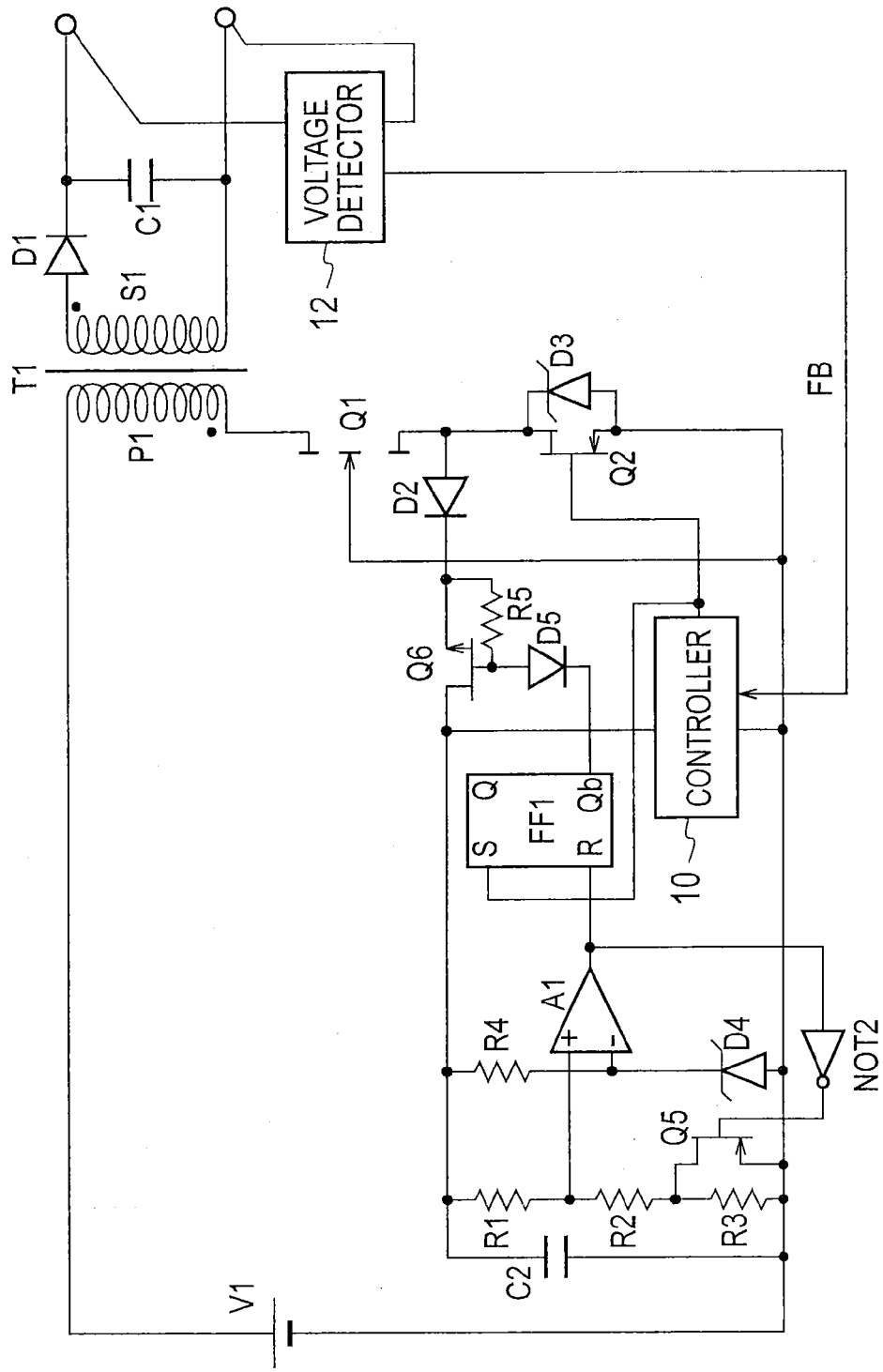
FIG. 11 is a circuit diagram illustrating the details of the apparatus of FIG. 10.

The UVLO circuit 15 is a low-voltage detector that includes, for example, resistors R1, R2, R3, and R4, a transistor Q5, a comparator A1, a NOT gate NOT2, and a zener diode D4 as illustrated in FIG. 11. These elements of the UVLO circuit 15 correspond to the same elements illustrated in FIG. 1. An output from the comparator A1 of the UVLO circuit 15 is connected to a reset terminal R of a flip-flop FF1. An inverting output terminal Qb of the flip-flop FF1 is connected to a control terminal of the switch SW. An output terminal of the controller 10 is connected to a set terminal S of the flip-flop FF1 and a gate of the switching element Q2.

The remaining configuration of Embodiment 4 is the same as Embodiment 1 illustrated in FIG. 1, and therefore, like parts are represented with like reference marks.

Operation of the drive circuit according to the present embodiment will be explained. In a normal state (with a low-level signal), the switch SW is ON. When the inverting output terminal Qb of the flip-flop FF1 provides a high-level signal, the switch SW turns off.

At first, the gate of the switching element Q1 is connected to the ground. When a DC power source V1 is activated, a current passes to the switching element Q1 to charge the capacitor C2 through the diode D2 and switch SW.

If the charge voltage of the capacitor C2 exceeds a reference voltage of the UVLO circuit 15, the UVLO circuit 15 outputs a high-level signal to the reset terminal R of the flip-flop FF1. As a result, the inverting output terminal Qb of the flip-flop FF1 outputs a high-level signal to the switch SW to turn off the switch SW.

Before the charge voltage of the capacitor C2 exceeds the reference voltage of the UVLO circuit 15, the controller 10 starts to output an ON/OFF pulse signal to the gate of the switching element Q2.

At this time, the switching element Q1 is continuously ON until a gate voltage to the switching element Q1 exceeds a threshold voltage of the switching element Q1. When the gate voltage to the switching element Q1 exceeds the threshold voltage of the switching element Q1, the switching element Q1 starts an ON/OFF operation in synchronization with the ON/OFF operation of the switching element Q2.

If the charge voltage of the capacitor C2 decreases below the reference voltage of the UVLO circuit 15 during the period in which the controller 10 outputs the ON/OFF pulse signal, the UVLO circuit 15 outputs a low-level signal to the reset terminal R of the flip-flop FF1. As a result, the inverting output terminal Qb of the flip-flop FF1 outputs a low-level signal to the control terminal of the switch SW to turn on the switch SW.

When the controller 10 changes the ON pulse signal to an OFF pulse signal, the switching element Q2 turns off and the drain voltage of the switching element Q2 increases. When this drain voltage exceeds the charge voltage of the capacitor C2, a current of the switching element Q1 charges the capacitor C2.

When the charge voltage of the capacitor C2 exceeds the reference voltage of the UVLO circuit, the switch SW turns off. As a result, the current of the switching element Q1 passes through a drain-source capacitance (not illustrated) of the switching element Q2 and the source voltage of the switching element Q1 increases. Then, the gate voltage of the switching element Q1 quickly exceeds its threshold voltage to turn off the switching element Q1.

In this way, the drive circuit according to Embodiment 4 provides effects similar to those provided by the drive circuit of Embodiment 1.

FIG. 11 is a circuit diagram illustrating the details of the switching power source apparatus having the drive circuit according to Embodiment 4 of the present invention.

In FIG. 11, the resistors R1, R2, R3, and R4, transistor Q5, comparator A1, NOT gate NOT2, and zener diode D4 form the UVLO circuit 15 illustrated in FIG. 10.

A transistor Q6 that is a p-channel MOSFET corresponds to the switch SW illustrated in FIG. 10. Between a gate of the transistor Q6 and the cathode of the diode D2, a resistor R5 is connected. The gate of the transistor Q6 is connected to an anode of a diode D5. A cathode of the diode D5 is connected to the inverting output terminal Qb of the flip-flop FF1.

Figure 12:
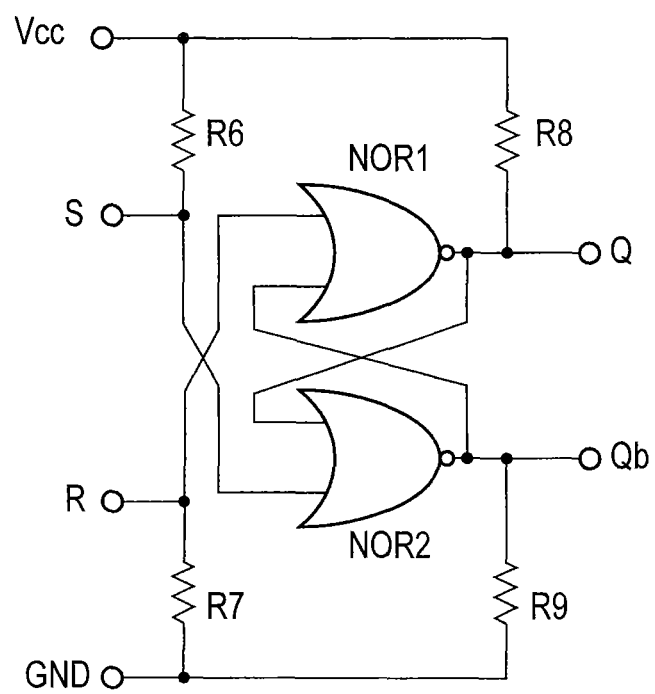
FIG. 12 is an internal connection diagram illustrating a flip-flop FF1 of the apparatus of FIG. 11.

FIG. 12 is an internal connection diagram of the flip-flop FF1 in the switching power source apparatus of FIG. 11. The flip-flop FF1 of FIG. 12 is a set preference circuit.

In FIG. 12, a power source Vcc is connected to a first end of a resistor R6 and a first end of a resistor R8. A second end of the resistor R6 is connected to the set terminal S of the flip-flop FF1 and a first input terminal of a NOR gate NOR2. The ground is connected to a first end of a resistor R7 and a first end of a resistor R9. A second end of the resistor R7 is connected to the reset terminal R of the flip-flop FF1 and a first input terminal of a NOR gate NOR1.

A second end of the resistor R8 is connected to an output terminal Q of the flip-flop FF1, an output terminal of the NOR gate NOR1, and a second input terminal of the NOR gate NOR2. A second end of the resistor R9 is connected to the inverting output terminal Qb of the flip-flop FF1, an output terminal of the NOR gate NOR2, and a second input terminal of the NOR gate NOR1.

Operation of the drive circuit according to the present embodiment illustrated in FIG. 11 will be explained. When the DC power source V1 is activated, a divided voltage by the gate resistor R5 and the resistor R9, which is present between the inverting output terminal Qb of the flip-flop FF1 and the ground, is applied to the gate of the transistor Q6, to turn on the transistor Q6.

At the startup of the power source, the switching element Q1 is ON, and therefore, a charge current passes through a primary winding P1, the switching element Q1, and the diode D2 to the transistor Q6.

After the transistor Q6 turns on, the current passes through the capacitor C2 and the voltage VC2 of the capacitor C2 increases to operate the controller 10. An operation start voltage of the controller 10 is so set that the switching element Q2 carries out an ON/OFF operation.

When the voltage VC2 of the capacitor C2 exceeds the reference voltage of the UVLO circuit 15, the UVLO circuit 15 provides the reset terminal R of the flip-flop FF1 with a reset signal, so that the inverting output terminal Qb of the flip-flop FF1 outputs a high-level signal. This turns off the transistor Q6 to protect the transistor Q6 from the overvoltage of the capacitor C2.

In a normal operation, the flip-flop FF1 detects the voltage VC2 of the capacitor C2 when the switching element Q2 turns off, and if the detected voltage is low, turns on the transistor Q6.

A drain current IdQ1 of the switching element Q1 passes through the diode D2 to the capacitor C2, thereby charging the capacitor C2. The flip-flop FF1 turns on/off the transistor Q6, to prevent the charging current from the switching element Q1 from always passing through the capacitor C2.

In this way, Embodiment 4 secures source power for the controller 10 without providing the transformer T1 with an auxiliary winding. In addition, the present embodiment needs no startup circuit for supplying source power to the controller 10 at startup.

Figure 13:
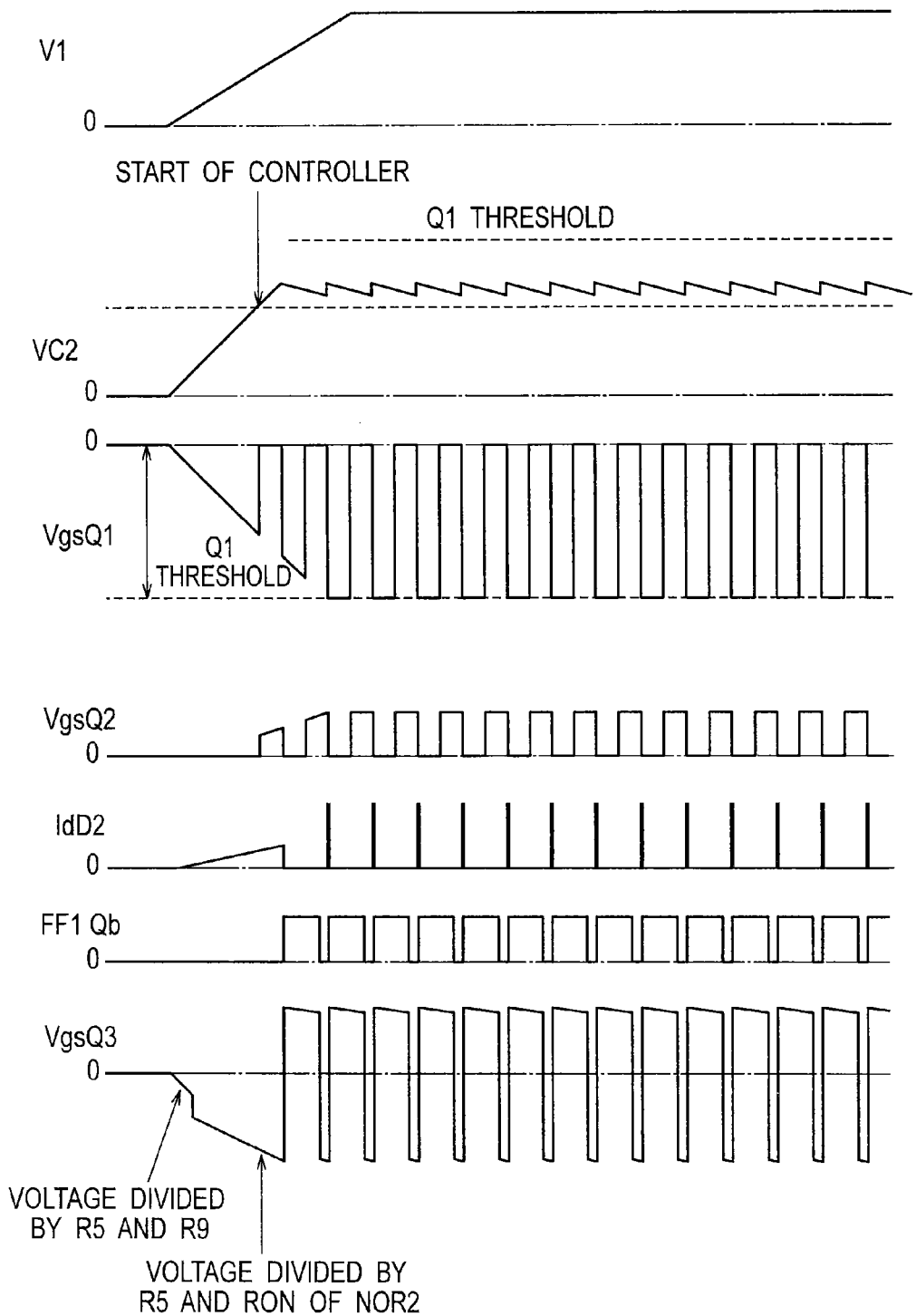
FIG. 13 is a timing chart illustrating a startup operation of the apparatus of FIG. 11.
Figure 14:
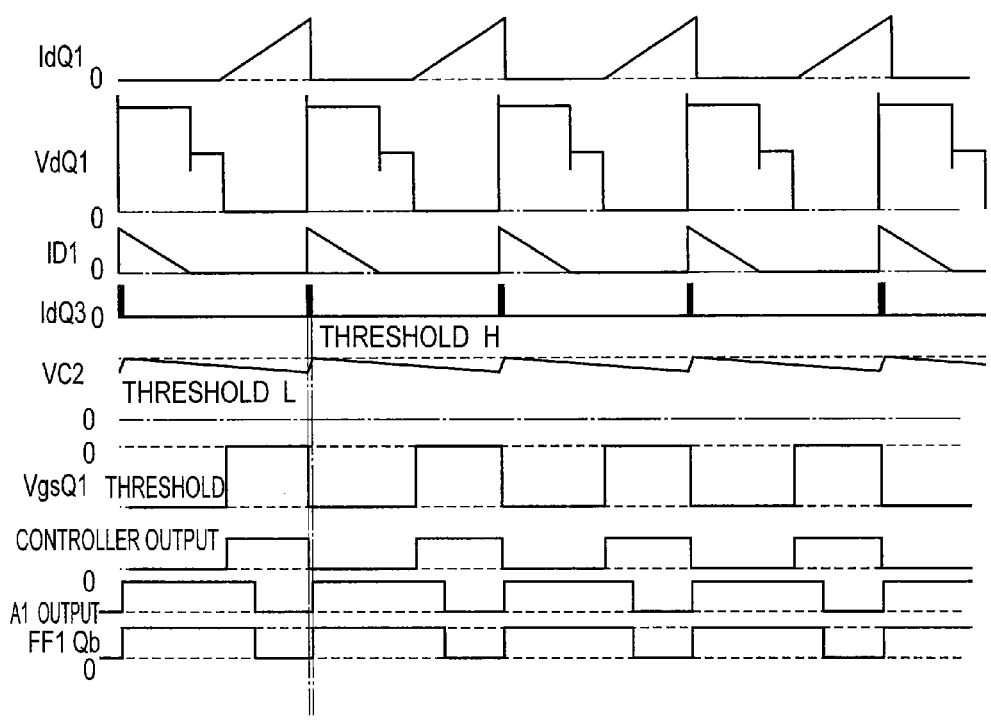
FIG. 14 is a timing chart illustrating a normal operation of the apparatus of FIG. 11.

FIG. 13 is a timing chart illustrating the startup operation of the switching power source apparatus having the drive circuit according to Embodiment 4. FIG. 14 a timing chart illustrating the normal operation of the switching power source apparatus having the drive circuit according to Embodiment 4.

Drive circuits according to modifications of the above-mentioned embodiments will be explained.
(Modification 1 of Embodiment 4)

Figure 15:
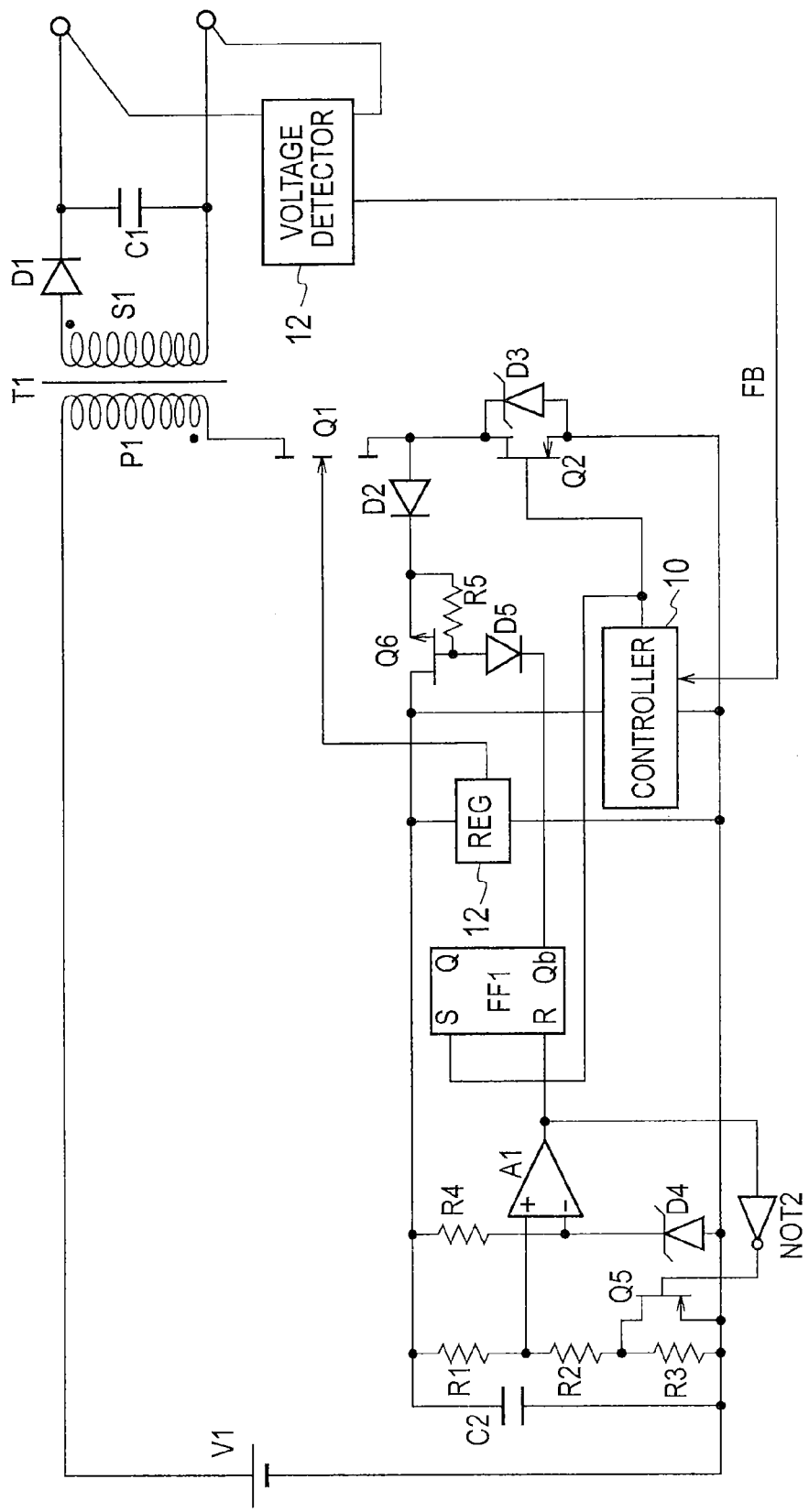
FIG. 15 is a circuit diagram illustrating a switching power source apparatus having a drive circuit according to Modification 1 of Embodiment 4 of the present invention.

FIG. 15 is a circuit diagram illustrating a switching power source apparatus having a drive circuit according to Modification 1 of Embodiment 4 of the present invention. Compared with the drive circuit of Embodiment 4 illustrated in FIG. 11, the drive circuit of Modification 1 of Embodiment 4 illustrated in FIG. 15 is characterized in that it arranges a regulator 17 serving as a constant voltage source between both ends of the controller 10. The regulator 17 supplies a gate voltage to the switching element Q1.

In an optimum condition, the controller 10 receives a source voltage of |Vth(Q1)|−VF(D2). The regulator 17 increases the source voltage for the controller 10 by the voltage of the regulator 17. This is effective when the threshold voltage of the switching element Q1 is insufficient to operate the controller 10.

It is possible to replace the diode D2, transistor Q6, and resistor R5 with a regulator block. It is also possible to replace the comparator A1 with the UVLO circuit 15.

(Modification 1 of Embodiment 1)

Figure 16:
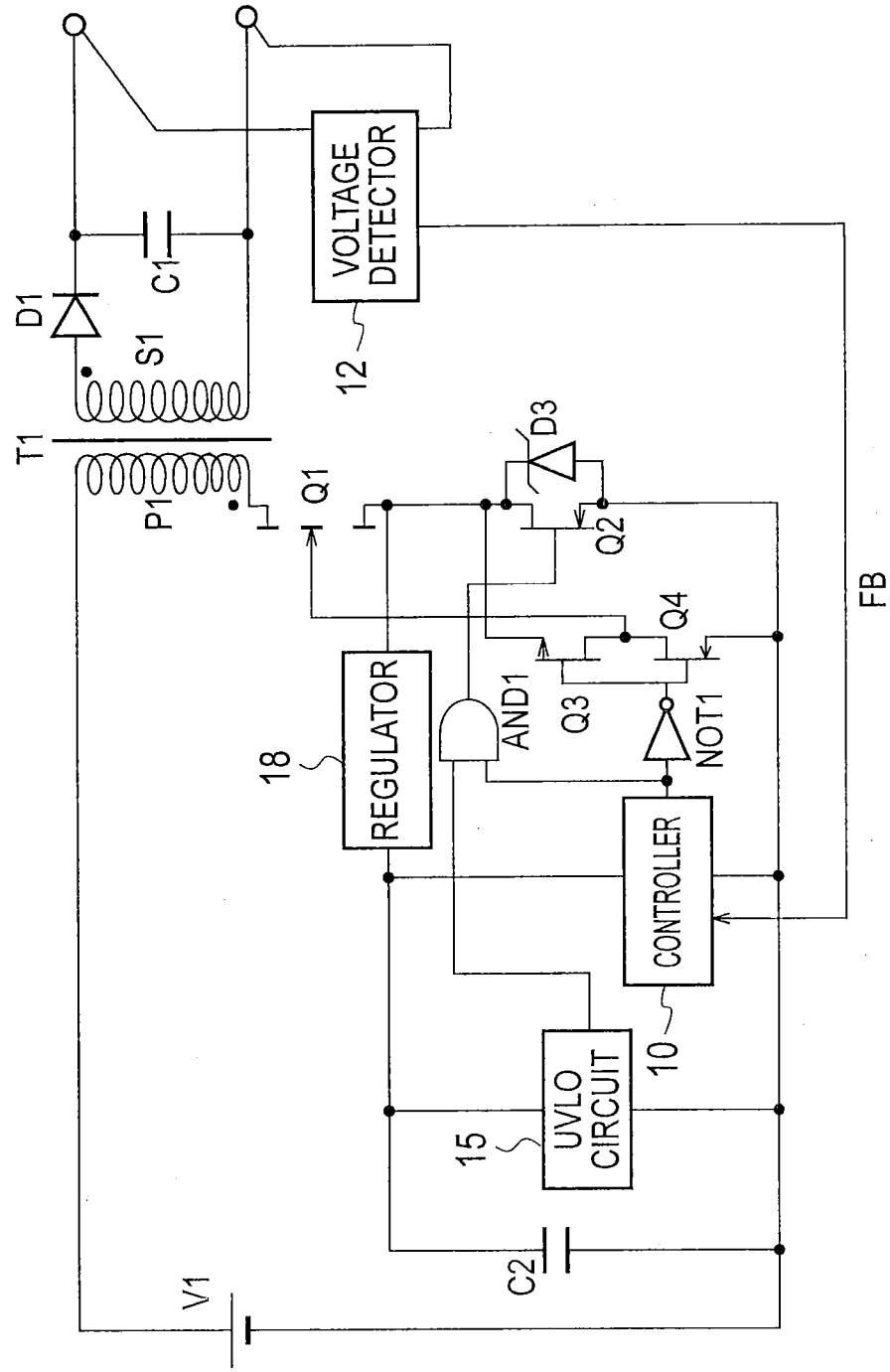
FIG. 16 is a circuit diagram illustrating a switching power source apparatus having a drive circuit according to Modification 1 of Embodiment 1 of the present invention.

FIG. 16 is a circuit diagram illustrating a switching power source apparatus having a drive circuit according to Modification 1 of Embodiment 1 of the present invention. The drive circuit of FIG. 16 is characterized in that it employs a regulator 18 instead of the diode D2 of Embodiment 1.

The regulator 18 is a constant voltage source that supplies a voltage from a connection point of the switching elements Q1 and Q2 to the capacitor C2, which supplies source power to the controller 10.

Employing the regulator 18 as a constant voltage source is effective to suppress an overvoltage to be applied to the controller 10.

(Modification 2 of Embodiment 4)

Figure 17:
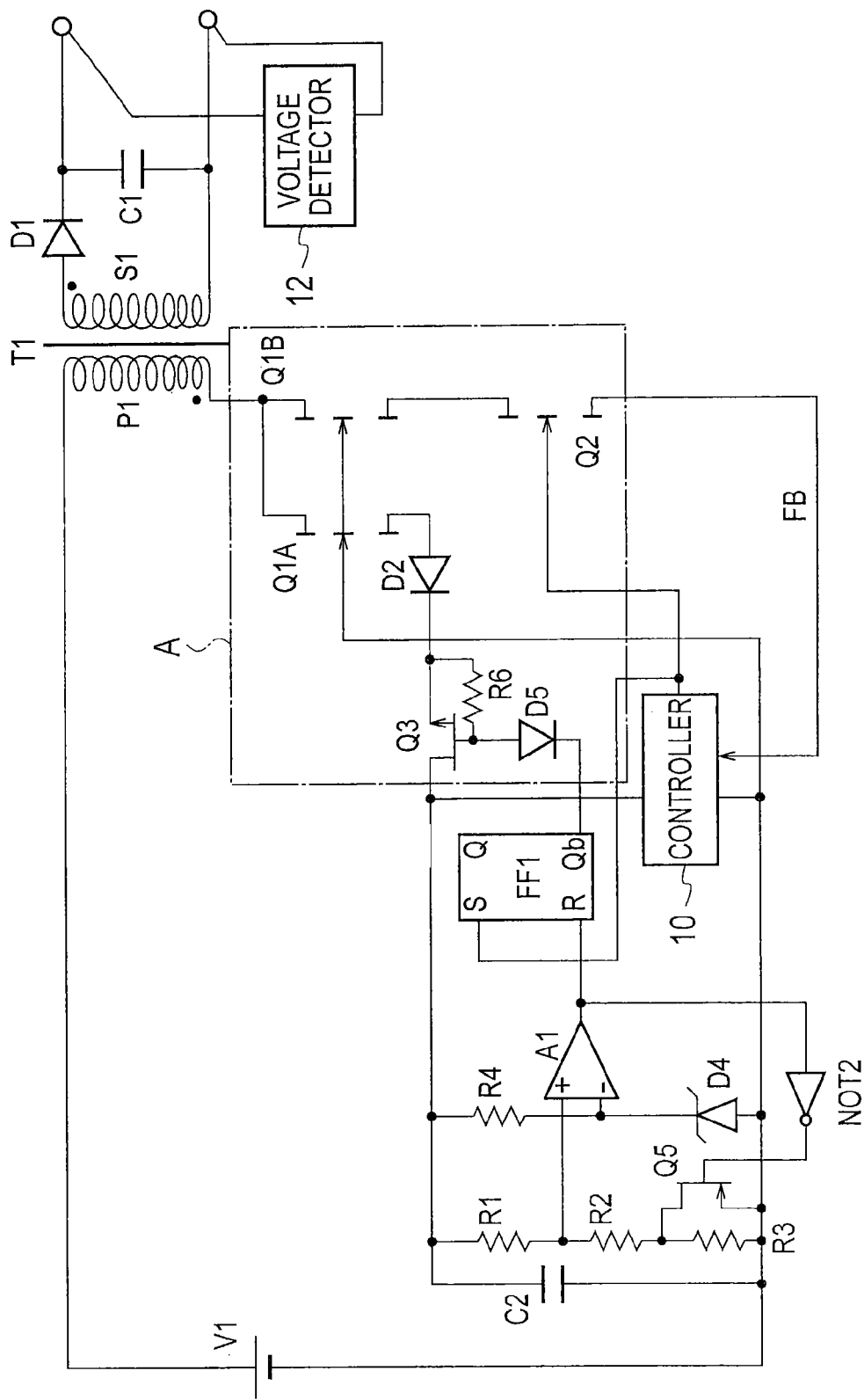
FIG. 17 is a circuit diagram illustrating a switching power source apparatus having a drive circuit according to Modification 2 of Embodiment 4 of the present invention.

FIG. 17 is a circuit diagram illustrating a switching power source apparatus having a drive circuit according to Modification 2 of Embodiment 4 of the present invention. Compared with the drive circuit of Embodiment 4 illustrated in FIG. 11, the drive circuit of Modification 2 of Embodiment 4 illustrated in FIG. 17 employs a normally-on switching element Q1A and normally-on switching element Q1B to serve as a power source for the controller 10. A source of the switching element Q1A is connected to the anode of the diode D2 and a source of the switching element Q1B is connected to the drain of the switching element Q2. Gates of the switching elements Q1A and Q2B are connected to the ground.

A block A encircled with a dotted line in FIG. 17 can be integrated into a one-chip configuration, to reduce the size of the drive circuit. For example, if the switching element Q1 is made of a GaN-FET chip, the elements in the block A can be formed in the GaN-FET chip, to provide an integrated circuit.

Operation of the drive circuit according to Modification 2 of Embodiment 4 will be explained. A drain-source capacitance CQ2 of the switching element Q2 is very small compared to the capacitance of the capacitor C2.

A current of the switching element Q1B at the time of switching off instantaneously charges the drain-source capacitance CQ2, to increase a source voltage of the switching element Q1B. Since the gate of the switching element Q1B is connected to the ground, a turn-off switching speed of the switching element Q1B becomes quicker.

With respect to the switching-off of the switching element Q1B, there is a delay until the switching element Q1A reaches a threshold voltage because the source of the switching element Q1A is connected through the diode D2 and transistor Q6 to the capacitor C2.

As a result, a current at the time of switching off passes through the switching element Q1A and the capacitor C2, so that a switching loss of the switching element Q1B is partly born by the switching element Q1A. Namely, the switching loss is thermally distributed.

Surge energy by a leakage inductance of the transformer T1 is used as a charging current for the capacitor C2, to reduce a surge voltage to be applied to the drains of the switching elements Q1A and Q1B.

(Modification 2 of Embodiment 1)

Figure 18:
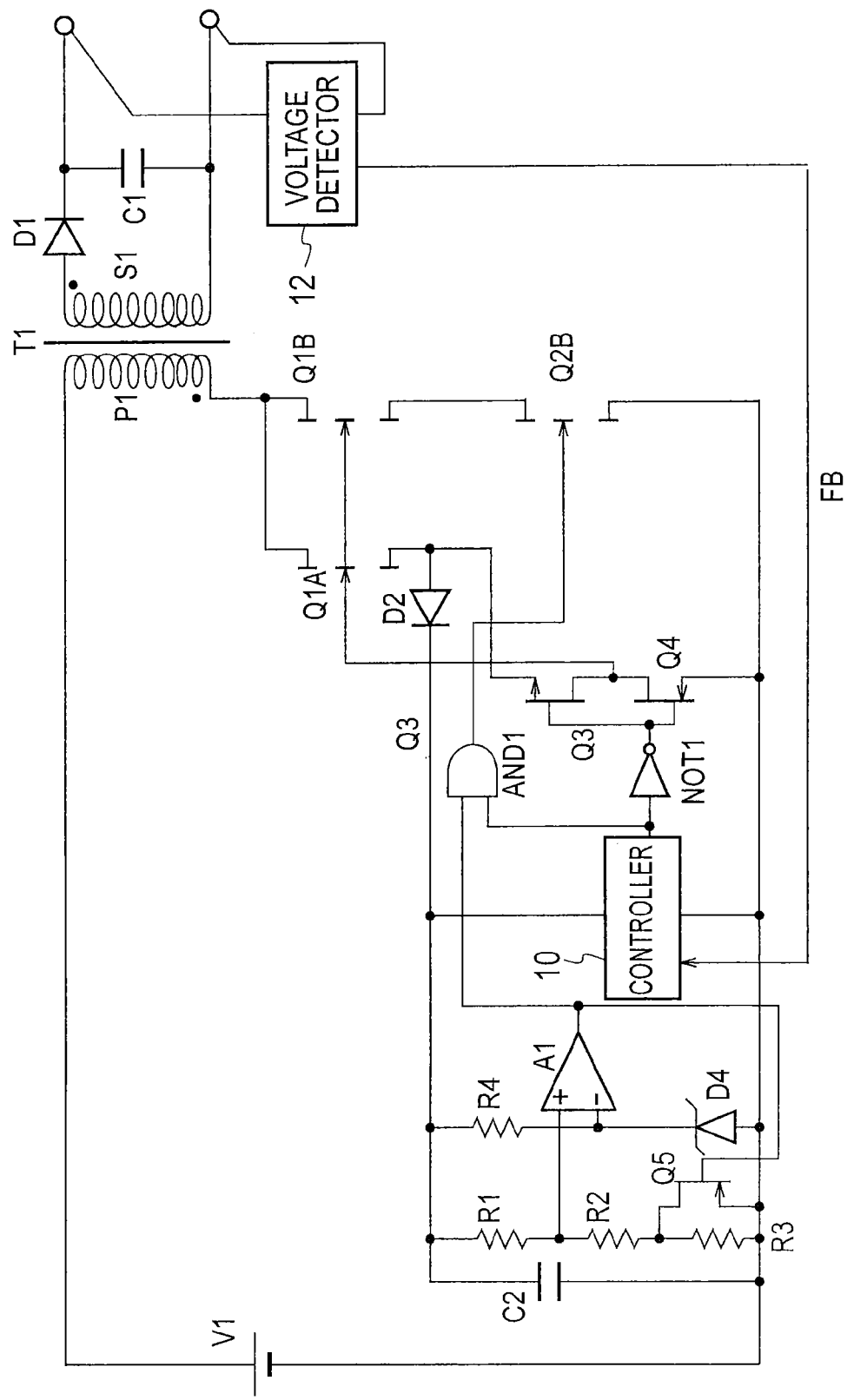
FIG. 18 is a circuit diagram illustrating a switching power source apparatus having a drive circuit according to Modification 2 of Embodiment 1 of the present invention.

FIG. 18 is a circuit diagram illustrating a switching power source apparatus having a drive circuit according to Modification 2 of Embodiment 1 of the present invention. Compared with the drive circuit of Embodiment 1 illustrated in FIG. 1, the drive circuit of Modification 2 of Embodiment 1 illustrated in FIG. 18 is characterized in that it employs a switching element Q1A that is an n-channel MOSFET and a switching element Q1B that is an n-channel MOSFET, to serve as a power source for the controller 10.

Drains of the switching elements Q1A and Q1B are connected to each other and gates thereof are also connected to each other. A source of the switching element Q1A is connected to the anode of the diode D2. The cathode of the diode D2 is connected to the first end of the capacitor C2. A source of the switching element Q1B is connected to a drain of a switching element Q2B.

The controller 10 supplies a pulse signal to turn on/off the two high-side switching elements Q1A and Q1B and the low-side switching element Q2B.

The drive circuit according to Modification 2 of Embodiment 1 provides effects similar to those provided by the drive circuit of Embodiment 1 and the drive circuit of Modification 2 of Embodiment 4.

(Modification 3 of Embodiment 1)

Figure 19:
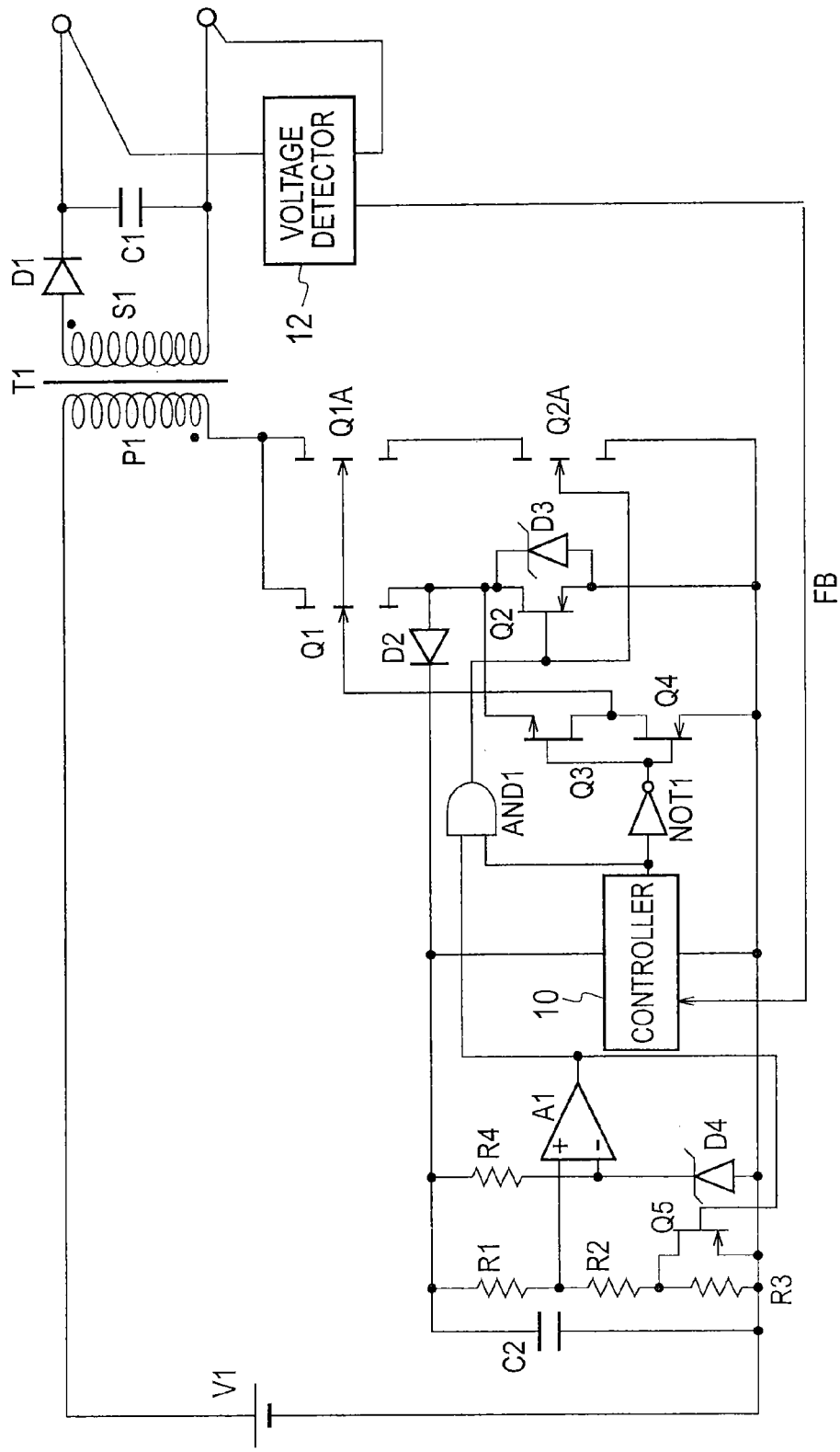
FIG. 19 is a circuit diagram illustrating a switching power source apparatus having a drive circuit according to Modification 3 of Embodiment 1 of the present invention.

FIG. 19 is a circuit diagram illustrating a switching power source apparatus having a drive circuit according to Modification 3 of Embodiment 1 of the present invention. Compared with the drive circuit of Embodiment 1 illustrated in FIG. 1, the drive circuit of Modification 3 of Embodiment 1 illustrated in FIG. 19 is characterized in that it connects a series circuit including a switching element Q1A (a second normally-on high-side switch) and a switching element Q2A (a second normally-off low-side switch) in parallel with the series circuit of the switching elements Q1 and Q2.

Gates of the high-side switching elements Q1 and Q1A are connected to each other and gates of the low-side switching elements Q2 and Q2A are connected to each other.

Adding the switching elements Q1A and Q2A increases a current in addition to the current passing through the switching elements Q1 and Q2.

In addition, Modification 3 of Embodiment 1 distributes a loss of the switching element Q1, thereby distributing generated heat and improving reliability.

(Modification 4 of Embodiment 1)

Figure 20:
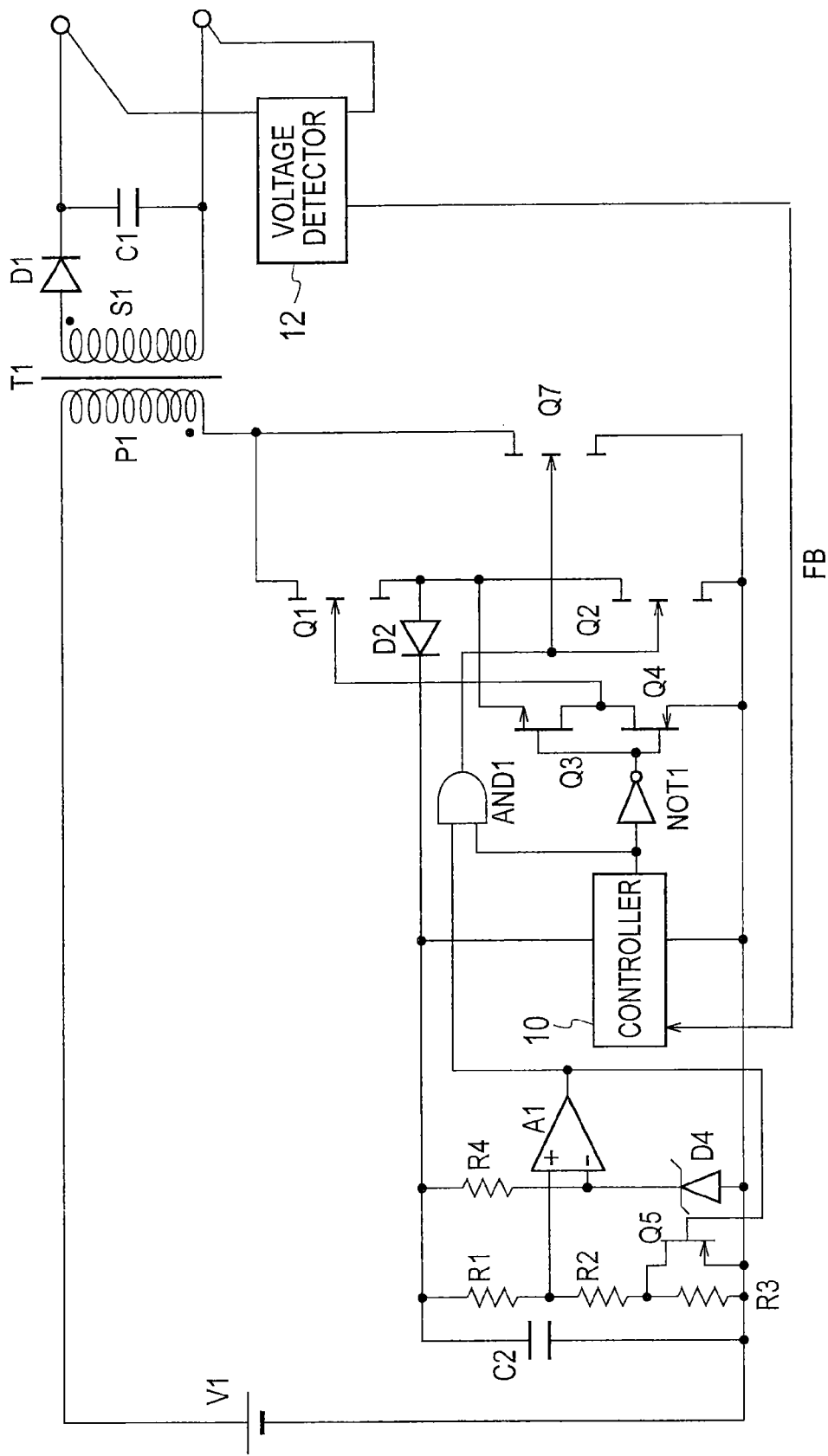
FIG. 20 is a circuit diagram illustrating a switching power source apparatus having a drive circuit according to Modification 4 of Embodiment 1 of the present invention.

FIG. 20 is a circuit diagram illustrating a switching power source apparatus having a drive circuit according to Modification 4 of Embodiment 1 of the present invention. Compared with the drive circuit according to Embodiment 1 illustrated in FIG. 1, the drive circuit of Modification 4 of Embodiment 1 illustrated in FIG. 20 is characterized in that it additionally employs a normally-off switching element Q7 in parallel with the series circuit of the switching elements Q1 and Q2.

A gate of the normally-off switching element Q7 is connected to the gate of the switching element Q2.

This configuration reduces a loss due to an ON resistance of the switching elements Q1 and Q2.

The switching elements Q1, Q2, and Q7 may be formed in a single chip. Alternatively, the switching element Q7 may be connected as an external FET, to increase a current passing through the transformer T1, thereby realizing a large output capacity.

For example, the switching elements Q1 to Q4, controller 10, and UVLO circuit may be integrated into a one-package integrated circuit. In this case, power to be controlled by the switching elements Q1 and Q2 may freely be increased by connecting the switching element Q7 thereto. Also, heat generated by the switching elements Q1, Q2, and Q7 may be distributed to improve reliability.

(Modification 5 of Embodiment 1)

Figure 21:
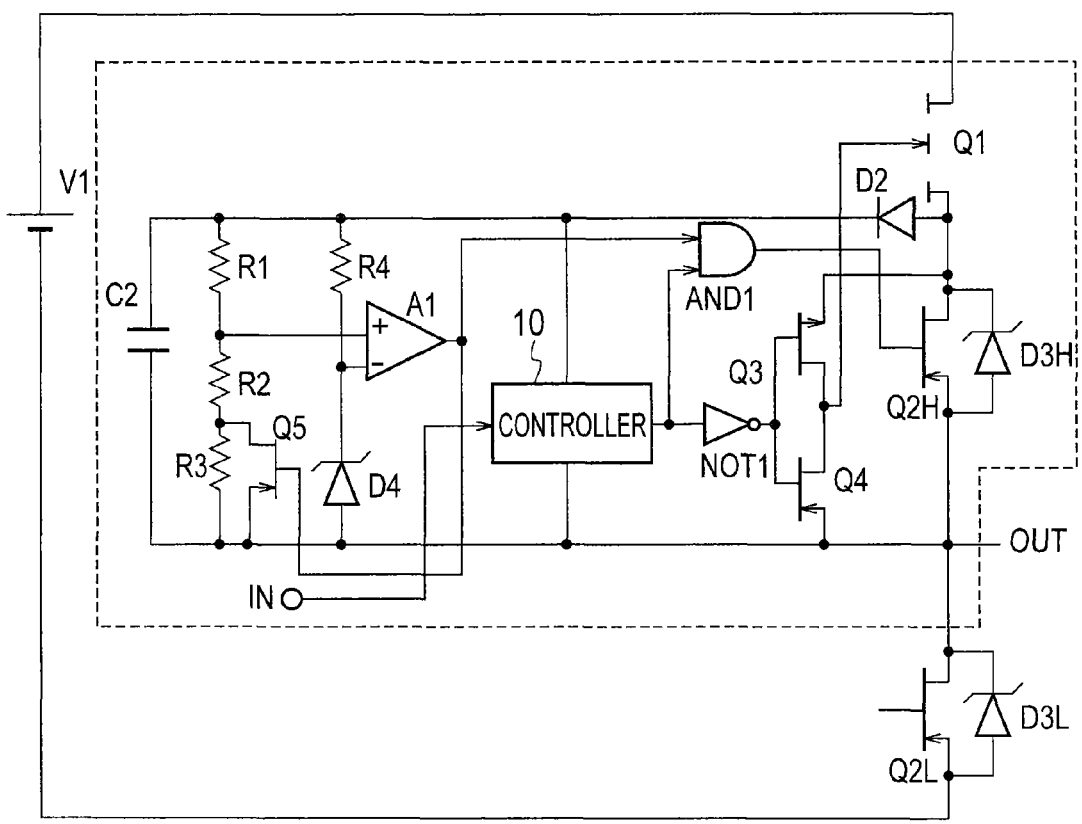
FIG. 21 is a circuit diagram illustrating a switching power source apparatus having a drive circuit according to Modification 5 of Embodiment 1 of the present invention.

FIG. 21 is a circuit diagram illustrating a switching power source apparatus having a drive circuit according to Modification 5 of Embodiment 1 of the present invention. Compared with the drive circuit of Embodiment 1 illustrated in FIG. 1, the drive circuit of Modification 5 of Embodiment 1 illustrated in FIG. 21 is characterized in that it employs a high-side circuit configuration also for a low-side part. A source of a high-side switching element Q2H is connected in series with a drain of a low-side switching element Q2L. A source of the switching element Q2L is connected to the negative electrode of the DC power source V1. In this way, the present invention is applicable to such a drive circuit of bridge configuration.

The present invention is not limited to the drive circuits mentioned above. For example, the present invention is applicable to a drive circuit employing an n-channel MOSFET instead of the diode D2.

As mentioned above, the drive circuit according to the present invention employs a normally-on element as a high-side switch and charges a capacitor from a DC power source through the high-side switch, so that the voltage of the capacitor is supplied to a controller. This configuration of the present invention secures source power for the controller without arranging an auxiliary winding for a transformer, and therefore, is low-cost.

The present invention is applicable to AC-DC converters, DC-DC converters, and the like.

This application claims benefit of priority under 35 USC §119 to Japanese Patent Applications No. 2011-203414, filed on Sep. 16, 2011 and No. 2012-167941, filed on Jul. 30, 2012, the entire contents of which are incorporated by reference herein.

What is claimed is:

1. A drive circuit for driving a normally-on high-side switch and a normally-off low-side switch, the high-side and low-side switches connected in a series manner and connected in parallel with a DC power source through a primary winding of a transformer, the drive circuit comprising:
   a controller configured to turn on/off the high-side and low-side switches by outputting a pulse signal;
   a rectifier having a first end connected to a connection point of the high-side and low-side switches;
   a capacitor connected to a second end of the rectifier and a first end of the DC power source and serving as a power source of the controller; and
   a driver turning on/off the high-side and low-side switches according to the pulse signal of the controller and a voltage of the capacitor, wherein
   the driver includes:
   a high-side switch control part configured to turn on/off the high-side switch according to the pulse signal of the controller;
   a comparator comparing the voltage of the capacitor with a threshold voltage; and
   a low-side switch control part configured to turn on/off the low-side switch according to an output from the comparator and the pulse signal of the controller, and wherein
   the comparator is a hysteresis comparator, turns on the low-side switch when the voltage of the capacitor increases to an upper threshold voltage, and turns off the low-side switch according to the pulse signal of the controller.

2. The drive circuit of claim 1, wherein
   the driver turns on the high-side switch and off the low-side switch when charging the capacitor.

3. The drive circuit of claim 1, further comprising
   a series circuit including a second normally-on high-side switch and a second normally-off low-side switch and connected in parallel with the series circuit of the normally-on high side switch and normally-off low-side switch, wherein
   control terminals of the high-side switches are connected to each other and control terminals of the low-side switches are connected to each other.

4. The drive circuit of claim 1, further comprising
   a normally-off switch connected in parallel with the series circuit of the normally-on high side switch and normally-off low-side switch, wherein
   a control terminal of the normally-off switch is connected to a control terminal of the low-side switch.

5. The drive circuit of claim 1, wherein
   a constant voltage source is employed instead of the rectifier, to supply a voltage of a connection point of the high-side and low-side switches to the capacitor serving as the power source of the controller.

6. The driver circuit of claim 2, wherein
   the driver turns on the high-side switch and off the low-side switch when the charge voltage of the capacitor decreases to a predetermined voltage or below.

7. A drive circuit for driving a normally-on high-side switch and a normally-off low-side switch, the high-side and low-side switches connected in a series manner and connected in parallel with a DC power source through a primary winding of a transformer, the drive circuit comprising:
   a controller configured to turn on/off the low-side switch by way of a pulse signal;
   a switch unit having a first end connected to a connection point of the high-side and low-side switches;
   a capacitor connected to a second end of the switch unit and a first end of the DC power source and serving as a power source of the controller;
   a driver configured to turn on/off the low-side switch according to the pulse signal of the controller and a voltage of the capacitor; and
   a switch unit control part configured to turn on/off the switch unit according to the pulse signal of the controller and the voltage of the capacitor, wherein a control electrode of the high-side switch is connected to one of a ground potential and a predetermined potential.

8. A drive circuit for driving a normally-on high-side switch and a normally-off low-side switch, the high-side and low-side switches connected in a series manner and connected in parallel with a DC power source through a primary winding of a transformer, the drive circuit comprising:
   a controller configured to turn on/off the low-side switch by outputting a pulse signal;
   a second normally-on high-side switch connected to a high-voltage main electrode and control electrode of the normally-on high-side switch;
   a switch unit having a first end connected to a low-voltage main electrode of the second normally-on high-side switch;
   a capacitor connected to a second end of the switch unit and a first end of the DC power source and serving as a power source for the controller;
   a driver configured to turn on/off the low-side switch according to the pulse signal of the controller and a voltage of the capacitor; and
   a switch unit control part configured to turn on/off the switch unit according to the pulse signal of the controller and the voltage of the capacitor, wherein the control electrode of the high-side switch is connected to one of a ground potential and a predetermined potential.

9. A drive circuit for driving a normally-on high-side switch and a normally-off low-side switch, the high-side and low-side switches connected in a series manner and connected in parallel with a DC power source through a primary winding of a transformer, the drive circuit comprising:

a second normally-on high-side switch connected to a high-voltage main electrode and control electrode of the normally-on high-side switch;

a controller configured to turn on/off the two high-side switches and low-side switch by outputting a pulse signal;

a rectifier having a first end connected to a low-voltage main electrode of the second normally-on high-side switch;

a capacitor connected to a second end of the rectifier and a first end of the DC power source and serving as a power source for the controller; and a driver configured to turn on/off the high-side switches and low-side switch according to the pulse signal of the controller and a voltage of the capacitor.

* * * * *